US012739925B2

(12) United States Patent
Wu

(10) Patent No.: US 12,739,925 B2
(45) Date of Patent: Sep. 15, 2026

(54) MANAGING RANDOM ACCESS IN EARLY DATA COMMUNICATION

(71) Applicant: GOOGLE LLC, Mountain View, CA (US)

(72) Inventor: Chih-Hsiang Wu, Taoyuan (TW)

(73) Assignee: GOOGLE LLC, Mountain View, CA (US)

( * ) Notice: Subject to any disclaimer, the term of this patent is extended or adjusted under 35 U.S.C. 154(b) by 269 days.

(21) Appl. No.: 18/289,994

(22) PCT Filed: Jun. 2, 2022

(86) PCT No.: PCT/US2022/031870

§ 371 (c)(1),
(2) Date: Nov. 8, 2023

(87) PCT Pub. No.: WO2022/256470

PCT Pub. Date: Dec. 8, 2022

(65) Prior Publication Data

US 2024/0244666 A1 Jul. 18, 2024

Related U.S. Application Data

(60) Provisional application No. 63/196,811, filed on Jun. 4, 2021.

(51) Int. Cl.
*H04W 76/20* (2018.01)
*H04W 74/0833* (2024.01)
(Continued)

(52) U.S. Cl.
CPC ....... *H04W 76/20* (2018.02); *H04W 74/0833* (2013.01); *H04W 76/30* (2018.02); *H04W 74/0836* (2024.01)

(58) Field of Classification Search
None
See application file for complete search history.

(56) References Cited

U.S. PATENT DOCUMENTS

2019/0261354 A1* 8/2019 Fakoorian ............. H04L 1/1893
2020/0107295 A1* 4/2020 Lee .................. H04W 56/0045
(Continued)

FOREIGN PATENT DOCUMENTS

CN 111800856 A 10/2020
WO WO-2019/004690 A1 1/2019
(Continued)

OTHER PUBLICATIONS

International Application No. PCT/US2022/031870, International Search Report and Written Opinion, mailed Aug. 23, 2022.
(Continued)

*Primary Examiner* — Faiyazkhan Ghafoerkhan
(74) *Attorney, Agent, or Firm* — MARSHALL, GERSTEIN & BORUN LLP

(57) ABSTRACT

A distributed unit (DU) of a distributed base station, where the distributed base station that includes the DU and a central unit (CU), can perform a method for managing early data transmission (EDT) with a user equipment (UE). The method includes: performing (1402), while a radio connection between the UE and the DU is not active, a random access procedure, including receiving, from the UE, an uplink message formatted in accordance with a protocol for controlling radio resources; sending (1404), to the CU, a DU-to-CU message including the uplink message; receiving (1406), from the CU, a CU-to-DU message when a validity of the uplink message has been verified; generating (1408) a contention resolution ID for the UE; and transmitting (1410), to the UE, the contention resolution ID for EDT without transitioning the UE to a connected state.

16 Claims, 22 Drawing Sheets

(51) Int. Cl.
*H04W 76/30* (2018.01)
*H04W 74/0836* (2024.01)

(56) References Cited

U.S. PATENT DOCUMENTS

| | | | | |
|---|---|---|---|---|
| 2021/0058898 | A1* | 2/2021 | Lee | H04W 76/27 |
| 2021/0298085 | A1* | 9/2021 | Lee | H04W 72/23 |
| 2021/0315005 | A1* | 10/2021 | Choe | H04W 74/0833 |
| 2021/0329593 | A1* | 10/2021 | Lee | H04W 68/02 |
| 2022/0417901 | A1* | 12/2022 | Lee | H04W 68/02 |
| 2023/0209609 | A1* | 6/2023 | Lee | H04W 76/27<br>370/329 |
| 2023/0422149 | A1* | 12/2023 | Kim | H04W 48/06 |
| 2024/0008130 | A1* | 1/2024 | Kim | H04W 4/14 |
| 2024/0244666 | A1* | 7/2024 | Wu | H04W 74/0833 |

FOREIGN PATENT DOCUMENTS

| | | | | |
|---|---|---|---|---|
| WO | WO-2020166817 | A1 * | 8/2020 | H04W 76/27 |
| WO | WO-2020/223680 | A1 | 11/2020 | |
| WO | WO-2021/026739 | A1 | 2/2021 | |
| WO | WO-2021/045339 | A1 | 3/2021 | |
| WO | WO-2021/045464 | A1 | 3/2021 | |
| WO | WO-2021/150015 | A1 | 7/2021 | |
| WO | WO-2022/027455 | A1 | 2/2022 | |
| WO | WO-2022/031358 | A1 | 2/2022 | |

OTHER PUBLICATIONS

First Office Action for Chinese Application No. 202280039946.1, dated Mar. 13, 2026.

Intel Corporation, "[1101, 1103] Remaining issues in EDT security and fallback," 3GPP TSG RAN WG2 Meeting #103 (2018).

"3rd Generation Partnership Project; Technical Specification Group Radio Access Network; NG-RAN; F1 application protocol (F1AP) (Release 16)," 3GPP TS 38.473 V16.5.0 (2021).

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)," 3GPP TS 36.300 V16.4.0 (2020).

"3rd Generation Partnership Project; Technical Specification Group Radio Access Network; NG-RAN; Architecture description (Release 16)," 3GPP TS 38.401 V16.5.0 (2021).

"3rd Generation Partnership Project; Technical Specification Group Radio Access Network; NG-RAN; F1 general aspects and principles (Release 16)," 3GPP TS 38.470 V16.4.0 (2021).

"3rd Generation Partnership Project; Technical Specification Group Radio Access Network; NR; Medium Access Control (MAC) protocol specification (Release 16)," 3GPP TS 38.321 V16.4.0 (2021).

"3rd Generation Partnership Project; Technical Specification Group Radio Access Network; NR; NR and NG-RAN Overall Description; Stage 2 (Release 16)," 3GPP TS 38.300 V16.5.0 (2021).

"3rd Generation Partnership Project; Technical Specification Group Radio Access Network; NR; Radio Resource Control (RRC) protocol specification (Release 16)," 3GPP TS 38.331 V16.4.0 (2021).

* cited by examiner

MANAGING RANDOM ACCESS IN EARLY DATA COMMUNICATION

CROSS-REFERENCE TO RELATED APPLICATIONS

This patent application is a national stage application, filed under 35 U.S.C. § 371, of International Application No. PCT/US2022/031870, filed Jun. 2, 2022 and entitled "MANAGING RANDOM ACCESS IN EARLY DATA COMMUNICATION," which claims priority to U.S. Provisional Application No. 63/196,811, filed Jun. 4, 2021 and entitled "MANAGING RANDOM ACCESS IN EARLY DATA COMMUNICATION," the disclosures of which are incorporated by reference herein in their entireties.

FIELD OF THE DISCLOSURE

This disclosure relates generally to wireless communications and, more particularly, to communication of uplink and/or downlink data at a user equipment (UE) and/or a radio access network (RAN) when the UE operates in an inactive or idle state associated with a protocol for controlling radio resources.

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Generally speaking, a base station operating a cellular radio access network (RAN) communicates with a user equipment (UE) using a certain radio access technology (RAT) and multiple layers of a protocol stack. For example, the physical layer (PHY) of a RAT provides transport channels to the Medium Access Control (MAC) sublayer, which in turn provides logical channels to the Radio Link Control (RLC) sublayer, and the RLC sublayer in turn provides data transfer services to the Packet Data Convergence Protocol (PDCP) sublayer. The Radio Resource Control (RRC) sublayer is disposed above the PDCP sublayer.

The RRC sublayer specifies the RRC_IDLE state, in which a UE does not have an active radio connection with a base station; the RRC_CONNECTED state, in which the UE has an active radio connection with the base station; and the RRC_INACTIVE state to allow a UE to more quickly transition back to the RRC_CONNECTED state due to Radio Access Network (RAN)-level base station coordination and RAN-paging procedures. In some cases, the UE in the RRC_IDLE or RRC_INACTIVE state has only one, relatively small packet to transmit. In these cases, the UE in the RRC_IDLE or RRC_INACTIVE state can perform an early data transmission without transitioning to the RRC_CONNECTED state, e.g., by using techniques as specified in section 7.3a-7.3d in 3GPP specification 36.300 v16.4.0.

In section 7.3d of the 3GPP specification, a base station (i.e., eNB or ng-eNB) can transmit to the UE an RRCConnectionRelease message that includes a preconfigured uplink resource (PUR) configuration, while the UE is in the RRC_CONNECTED state. Thus, the UE in one implementation can transmit to the base station an RRCEarlyDataRequest message containing a user data packet, as described in section 7.3d in the 3GPP specification. In another implementation, the UE can transmit to the base station a user data packet on a Dedicated Traffic Channel (DTCH) multiplexed with an RRCConnectionResumeRequest message on a Common Control Channel (CCCH). That is, the UE generates a MAC protocol data unit (PDU) that includes an RRCConnectionResumeRequest message and the user data packet, as described in section 7.3d in the 3GPP specification.

However, implementing early data communication techniques while the UE is in an inactive state (e.g., RRC_INACTIVE) or an idle state (e.g., RRC_IDLE) presents several challenges. In particular, a 5G NR radio access network (i.e., the NG-RAN) may include distributed base stations, where each distributed base station includes a central unit (CU) and at least one distributed unit (DU). It is not clear how a distributed base station manages random access for a UE operating in an inactive state or an idle state to perform early data communication. For example, it is not clear how the distributed base station manages random access to begin early data communication with the UE, or how the distributed base station manages additional random access procedures when early data communication is already ongoing with the UE.

SUMMARY

A base station and/or a UE can implement the techniques of this disclosure for managing random access in early data communication. Initially, a distributed unit (DU) of the base station receives, from the UE, a random access preamble and an uplink (UL) MAC PDU including a UL RRC message, for initiating a random access procedure. The DU sends a DU-to-CU message including the UL RRC message to a central unit (CU) of the base station. Either the DU-to-CU message or the UL RRC message can include an indication that the UE is requesting authorization for early data transmission (EDT). To complete the random access procedure, in some implementations, the DU delays sending a contention resolution identity (ID) to the UE for EDT until the DU receives a CU-to-DU message from the CU. In other implementations, the DU sends the contention resolution ID to the UE without waiting for the CU to send the CU-to-DU message.

In the implementations described above, the DU can send the contention resolution ID to the UE in a DL MAC PDU. The DU does not include an RRC setup message (e.g., RRCSetup message or RRCConnectionSetup message) in the DL MAC PDU that may trigger the UE to transition to the connected state, so that the UE can remain in either idle or inactive state to perform EDT without transitioning to the connected state. The contention resolution ID included in the DL MAC PDU can be a MAC control element (CE). Besides the contention resolution ID, the DU can include other MAC CE(s) in the DL MAC PDU, in some implementations, or exclude these other MAC CE(s).

In some scenarios and implementations, the base station can manage the random access procedure described above to initially enable EDT for the UE, and if necessary, manage a second random access procedure to prolong EDT after the UE has already received the contention resolution ID described above. In some implementations, the random access procedure(s) can each be a 4-step random access procedure, or a 2-step random access procedure.

One example embodiment of these techniques is a method performed by a distributed unit (DU) of a distributed base station for managing early data communication with a user equipment (UE). The distributed base station includes the DU and a central unit (CU). The method can be executed by processing hardware and includes performing, while a radio connection between the UE and the DU is not active, a random access procedure, including receiving, from the UE, an uplink message formatted in accordance with a protocol for controlling radio resources. The method also includes sending, to the CU, a DU-to-CU message including the uplink message. The method further includes receiving, from the CU, a CU-to-DU message when a validity of the uplink message has been verified. The method also includes generating a contention resolution identity (ID) for the UE, and transmitting, by to the UE, the contention resolution ID for EDT without transitioning the UE to a connected state.

A further example embodiment of these techniques is a network node of a distributed base station including processing hardware and configured to implement the method above.

Another example embodiment of these techniques is a method performed by a UE for managing early data communication with a RAN. The method can be executed by processing hardware and includes receiving, from the RAN, a first temporary identifier. The method also includes performing, while a radio connection between the UE and the RAN is not active, a random access procedure, including receiving, from the RAN, a second temporary identifier. The method further includes determining whether to use the first temporary identifier or the second temporary identifier for EDT.

A further example embodiment of these techniques is a UE including processing hardware and configured to implement the method above.

DETAILED DESCRIPTION OF THE DRAWINGS

Figure 1A:
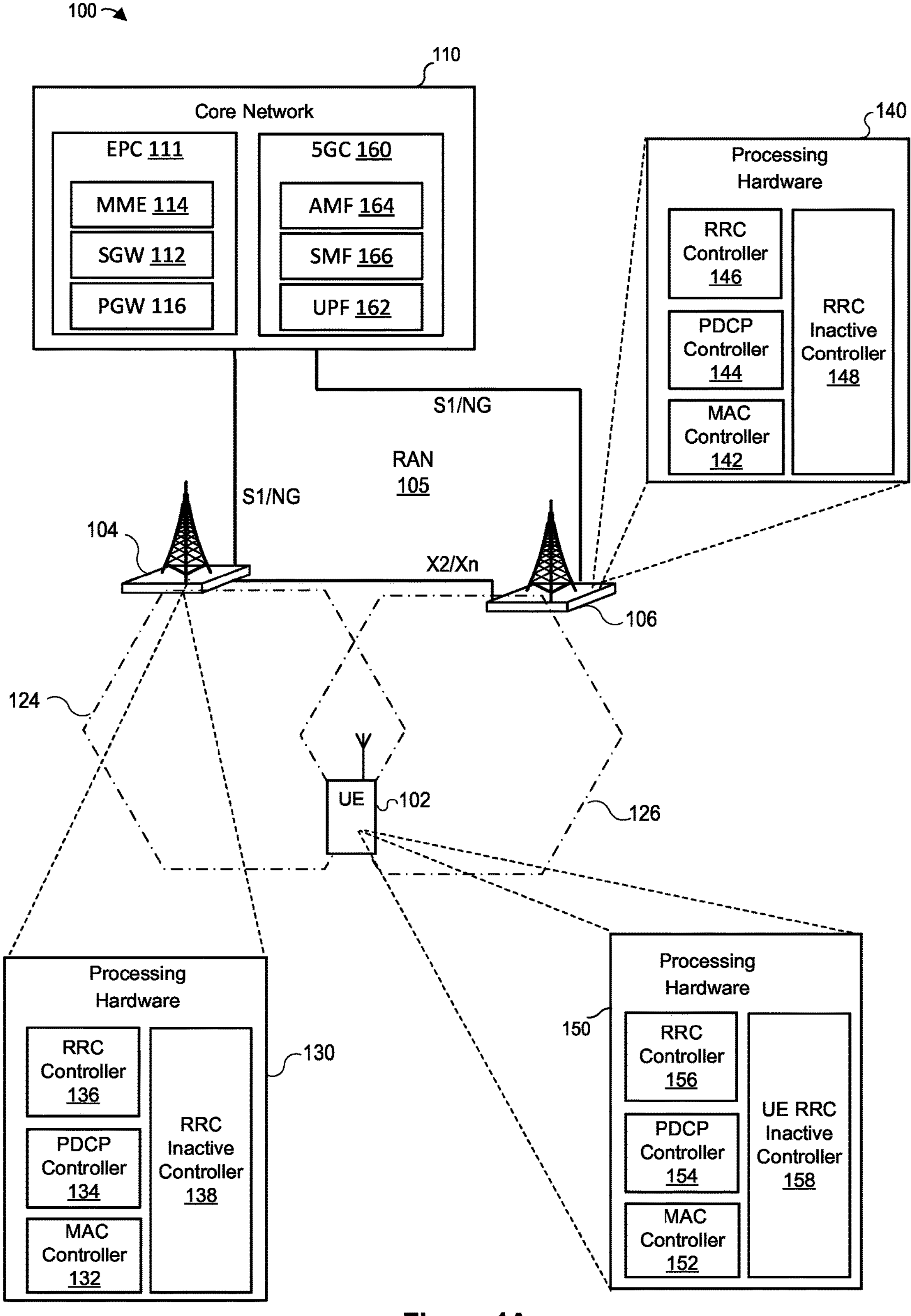
FIG. 1A is a block diagram of an example wireless communication system in which a RAN and/or a UE implement the techniques of this disclosure to perform a random access procedure for early data communication.

Referring first to FIG. 1A, an example wireless communication system 100 includes a UE 102, a base station (BS) 104, a base station 106, and a core network (CN) 110. The base stations 104 and 106 can operate in a RAN 105 connected to the core network (CN) 110. The CN 110 can be implemented as an evolved packet core (EPC) 111 or a fifth generation (5G) core (5GC) 160, for example. The CN 110 can also be implemented as a sixth generation (6G) core in another example.

The base station 104 covers a cell 124, and the base station 106 covers a cell 126. If the base station 104 is a gNB, the cell 124 is an NR cell. If the base station 104 is an ng-eNB, the cell 124 is an evolved universal terrestrial radio access (E-UTRA) cell. Similarly, if the base station 106 is a gNB, the cell 126 is an NR cell, and if the base station 106 is an ng-eNB, the cell 126 is an E-UTRA cell. The cells 124 and 126 can be in the same Radio Access Network Notification Areas (RNA) or different RNAs. In general, the RAN 105 can include any number of base stations, and each of the base stations can cover one, two, three, or any other suitable number of cells. The UE 102 can support at least a 5G NR (or simply, "NR") or E-UTRA air interface to communicate with the base stations 104 and 106. Each of the base stations 104, 106 can connect to the CN 110 via an interface (e.g., S1 or NG interface). The base stations 104 and 106 also can be interconnected via an interface (e.g., X2 or Xn interface) for interconnecting NG RAN nodes.

Among other components, the EPC 111 can include a Serving Gateway (SGW) 112, a Mobility Management Entity (MME) 114, and a Packet Data Network Gateway (PGW) 116. The SGW 112 in general is configured to transfer user-plane packets related to audio calls, video calls, Internet traffic, etc., and the MME 114 is configured to manage authentication, registration, paging, and other related functions. The PGW 116 provides connectivity from the UE 102 to one or more external packet data networks, e.g., an Internet network and/or an Internet Protocol (IP) Multimedia Subsystem (IMS) network. The 5GC 160 includes a User Plane Function (UPF) 162 and an Access and Mobility Management (AMF) 164, and/or Session Management Function (SMF) 166. Generally speaking, the UPF 162 is configured to transfer user-plane packets related to audio calls, video calls, Internet traffic, etc., the AMF 164 is configured to manage authentication, registration, paging, and other related functions, and the SMF 166 is configured to manage PDU sessions.

As illustrated in FIG. 1A, the base station 104 supports a cell 124, and the base station 106 supports a cell 126. The cells 124 and 126 can partially overlap, so that the UE 102 can select, reselect, or hand over from one of the cells 124 and 126 to the other. To directly exchange messages or information, the base station 104 and base station 106 can support an X2 or Xn interface. In general, the CN 110 can connect to any suitable number of base stations supporting NR cells and/or EUTRA cells.

As discussed in detail below, the UE 102 and/or the RAN 105 can implement the techniques of this disclosure for communicating when the radio connection between the UE 102 and the RAN 105 is suspended, e.g., when the UE 102 operates in the inactive or idle state of the protocol for controlling radio resources between the UE 102 and the RAN 105. For clarity, the examples below refer to the RRC_INACTIVE or RRC_IDLE state of the RRC protocol.

As used in this disclosure, the term "data" or "data packet" refers to either signaling, control-plane information at a protocol layer of controlling radio resources (e.g., RRC), controlling mobility management (MM), controlling session management (SM), or to non-signaling, non-control-plane information at protocol layers above any of the protocol layers for controlling radio resources (e.g., RRC), controlling mobility management (MM), controlling session management (SM), or controlling quality of service (QOS) flows (e.g., service data adaptation protocol (SDAP)). The data to which the UE and/or the RAN applies the techniques of this disclosure can include for example Internet of things (IOT) data, Ethernet traffic data, Internet traffic data, or a short message service (SMS) message. Further, the UE 102 in some implementations applies these techniques only if the size of the data is below a certain threshold value.

In the example scenarios discussed below, the UE 102 transitions to the RRC_INACTIVE or RRC_IDLE state, selects a cell of the base station 104, and exchanges data with the base station 104 either via the base station 106 or with the base station 104 directly, without transitioning to the RRC_CONNECTED state. After the UE 102 determines that data is available for UL transmission in the RRC_INACTIVE or RRC_IDLE state, the UE 102 can generally secure the data, include the secured data as a security-protected packet in a first UL PDU, and transmit the first UL PDU to the RAN 105 in a second UL PDU.

As a more specific example, the UE 102 can apply one or more security functions to secure-protect the UL data packet, generate a first UL PDU that includes the security-protected UL data packet, include a UL RRC message along with the first UL PDU in a second UL PDU, and transmit the second UL PDU to the RAN 105. After receiving the second UL PDU, the RAN 105 can identify the UE 102 based on a UE identity/identifier (ID) of the UE 102 that the UE 102 included in the UL RRC message. In some implementations, the UE ID can be an inactive Radio Network Temporary Identifier (I-RNTI), resume ID, or a non-access stratum (NAS) ID. The NAS ID can be an S-Temporary Mobile Subscriber Identity (S-TMSI) or a Global Unique Temporary Identifier (GUTI), in some implementations.

In some implementations, the security function that the UE 102 applied to the UL data packet as discussed above can include an integrity protection and/or encryption function. In applying integrity protection, the UE 102 can generate a message authentication code for integrity (MAC-I) to protect integrity of the data. Thus, the UE 102 in this case generates a security-protected packet that includes the data and the MAC-I. In applying an encryption function, the UE 102 can encrypt the data to obtain an encrypted packet, so that the security-protected packet includes encrypted data. When both integrity protection and encryption are applied, the UE 102 can generate a MAC-I for protecting integrity of the data and encrypt the data along with the MAC-I to generate an encrypted packet and an encrypted MAC-I. The UE 102 then can transmit the security-protected packet to the RAN 105, while still in the RRC_INACTIVE or RRC_IDLE state.

In some implementations, the data described above is a UL service data unit (SDU) of the PDCP or SDAP. The UE 102 applies the security function to the SDU and includes the secured SDU in a first UL PDU (e.g., a UL PDCP PDU). The UE 102 then includes the UL PDCP PDU in a second UL PDU such as a UL MAC PDU, which can be associated with the MAC layer. Thus, the UE 102 in these cases transmits the secured UL PDCP PDU in the UL MAC PDU. In some implementations, the UE 102 can include, in the UL MAC PDU, a UL RRC message. In other implementations, the UE 102 may not include a UL RRC message in the UL MAC PDU. In this case, the UE 102 may not include a UE ID of the UE 102 in the UL MAC PDU. In yet other implementations, the UE 102 can include the UL PDCP PDU in a UL RLC PDU and then include the UL RLC PDU in the UL MAC PDU. In implementations in which the UE 102 includes the UL RRC message in the UL MAC PDU, the UE 102 in some implementations generates an RRC MAC-I (e.g., resumeMAC-I field, as specified in 3GPP specification 38.331) and includes the RRC MAC-I in the UL RRC message. In other implementations, rather than generating the RRC MAC-I, the UE 102 can obtain the RRC MAC-I from the UL RRC message with an integrity key (e.g., $K_{RRCint}$ key), an integrity protection algorithm, and other parameters such as COUNT (e.g., 32-bit, 64-bit or 128-bit value), BEARER (e.g., 5-bit value), and DIRECTION (e.g., 1-bit value).

In other implementations, the data described above is a UL SDU of the NAS. The UE 102 applies the security function to the SDU and includes the secured SDU in a first UL PDU such as a UL NAS PDU, which can be associated with the NAS layer. For example, the NAS layer can be 5G MM or SM sublayer of 5G, evolved packet system (EPS), or 6G. Then the UE 102 can include the UL NAS PDU in a second UL PDU such as a UL RRC message. Thus, the UE 102 in these cases transmits the (first) secured UL NAS PDU in the UL RRC message. In some implementations, the UE 102 can include the UL RRC message in a UL MAC PDU and transmits the UL MAC PDU to a base station (e.g., base station 104 or 106) via a cell (e.g., cell 124 or 126). The UE 102 may not include an RRC MAC-I in the UL RRC message, or alternatively, include an RRC MAC-I as described above.

In some implementations, the UL RRC message described above can be a common control channel (CCCH) message, an RRC resume request message, or an RRC early data request message. The UL RRC message can include a UE ID of the UE 102 as described above.

In some scenarios and implementations in which the UE ID of the UE 102 is included in the UL RRC message as described above, the base station 106 can retrieve the UE ID of the UE 102 from the UL RRC message and identify, based to the determined UE ID, the base station 104 as the destination of the data in the first UL PDU. In one implementation, the base station 106 retrieves the first UL PDU from the second UL PDU and transmits the first UL PDU to the base station 104. The base station 104 then retrieves the security-protected packet from the first UL PDU, applies security function(s) to decrypt the data and/or check the integrity protection, and transmits the data to the CN 110 (e.g., SGW 112, UPF 162, MME 114, or AMF 164) or an edge server. More specifically, the base station 104 derives security key(s) from UE context information of the UE 102. Then the base station 104 retrieves the data from the security-protected packet by using the security key(s) and transmits the data to the CN 110 or edge server. In another implementation, instead of the base station 104 retrieving the security-protected packet from the first UL PDU, the base station 106 retrieves the security-protected packet from the first UL PDU. More specifically, the base station 106 can perform a retrieve UE context procedure with the base station 104 to obtain UE context information of the UE 102 from the base station 104, and then derive security key(s) from the UE context information. Then the base station 106 retrieves the data from the security-protected packet by using the security key(s) and transmits the data to the CN 110 (e.g., UPF 162) or an edge server. In each of these implementations, when the security-protected packet is an encrypted packet, the base station 104 or 106 decrypts the encrypted packet to obtain the data by using the security key(s) (e.g., an (de-) encryption key). If the security-protected packet is an integrity-protected packet that includes the data and the MAC-I, the base station 104 or 106 can verify whether the MAC-I is valid for the security-protected packet by using the security key(s) (e.g., an integrity key). When the base station 104 or 106 confirms that the MAC-I is valid, the base station 104 or 106 sends the data to the CN 110 or edge server. On the other hand, when the base station 104 or 106 determines the MAC-I is invalid, the base station 104 or 106 discards the security-protected packet. Further, if the security-protected packet is both encrypted and integrity-protected and therefore includes the encrypted packet along with the encrypted MAC-I, the base station 104 or 106 decrypts the encrypted packet and the encrypted MAC-I to obtain the data and the MAC-I. The base station 104 or 106 then determines whether the MAC-Iis valid for the data. If the base station 104 or 106 determines that the MAC-I is valid, the base station 104 or 106 retrieves the data and forwards the data to the CN 110 or edge server. However, if the base station 104 or 106 determines that the MAC-I is invalid, the base station 104 or 106 discards the packet.

In other scenarios and implementations, the base station 104 can retrieve and use the UE ID of the UE 102 from the UL RRC message to determine that the base station 104 stores UE context information of the UE 102. Accordingly, the base station 104 retrieves the security-protected packet from the first UL PDU, retrieves the data from the security-protected packet, and sends the data to the CN 110 or edge server as described above.

Further, in some scenarios and implementations, the RAN 105 transmits data in the downlink (DL) direction to the UE 102 operating in the RRC_INACTIVE or RRC_IDLE state. In one implementation, when the base station 104 determines that data is available for DL transmission to the UE 102 currently operating in the RRC_INACTIVE or RRC_IDLE state, the base station 104 can secure the data to generate a security-protected packet, generate a first DL PDU that includes the security-protected packet, and include the first DL PDU in a second DL PDU. To secure the data, the base station 104 can apply security function(s) (e.g., integrity protection and/or encryption) to the data. More particularly, similar to the manner in which the UE 102 can secure data available for UL transmission, in applying integrity protection, the base station 104 can generate a MAC-I for protecting integrity of the data available for DL transmission, so that security-protected packet includes the DL data and the MAC-I. In applying an encryption function, the base station 104 can encrypt the data to generate an encrypted packet, so that the security-protected packet includes encrypted data. Further, when both integrity protection and encryption are applied, the base station 104 can generate a MAC-I for protecting integrity of the data and encrypt the data along with the MAC-I to generate an encrypted packet and an encrypted MAC-I.

In some implementations, the base station 104 generates a first DL PDU (e.g., a DL PDCP PDU) using the security-protected packet, includes the first DL PDU in a second DL PDU (e.g., a DL MAC PDU associated with the MAC layer), and transmits the second DL PDU to the UE 102 without causing the UE 102 to transition to the RRC_CONNECTED state. In some implementations, the base station 104 includes the DL PDCP PDU in a DL RLC PDU, and further includes the DL RLC PDU in the DL MAC PDU.

In another implementation, the base station 104 transmits the first DL PDU to the base station 106, which then generates a second DL PDU (e.g., a DL MAC PDU) that includes the first DL PDU and transmits the second DL PDU to the UE 102 without causing the UE 102 to transition to the RRC_CONNECTED state. In some implementations, the base station 106 generates a DL RLC PDU that includes the first DL PDU and includes the DL RLC PDU in the second DL PDU. In yet another implementation, the base station 104 includes the first DL PDU in a DL RLC PDU and transmits the DL RLC PDU to the base station 106, which in turn generates a second DL PDU (e.g., a DL MAC PDU) that includes the DL RLC PDU and transmits the second DL PDU to the UE 102.

In some implementations, the base station 104 or 106 generates a downlink control information (DCI) and a cyclic redundancy check (CRC) scrambled with an ID of the UE 102 to transmit the second DL PDU generated by the base station 104 or 106. In some implementations, the ID of the UE 102 can be a Radio Network Temporary Identifier (RNTI), such as a cell RNTI (C-RNTI), a temporary C-RNTI, or an inactive C-RNTI. The base station 104 or 106 can transmit the DCI and scrambled CRC on a physical downlink control channel (PDCCH) to the UE 102 operating in the RRC_INACTIVE or RRC_IDLE state. In some implementations, the base station 104 or 106 may assign the ID of the UE 102 to the UE 102 in a random access response that the base station 104 or 106 transmits in a random access procedure with the UE 102 before transmitting the DCI and scrambled CRC. In other implementations, the base station 104 or 106 may assign the ID of the UE 102 to the UE 102 in an RRC message (e.g., RRC release message or an RRC reconfiguration message) that the base station 104 or 106 transmits to the UE 102 before transmitting the DCI and scrambled CRC.

After receiving the DCI and scrambled CRC on the PDCCH, the UE 102 can confirm that the second DL PDU is addressed to the UE 102 according to the ID of the UE 102. The UE 102 then can retrieve the data from the security-protected packet. If the security-protected packet is an encrypted packet, the UE 102 can decrypt the encrypted packet using the appropriate decryption function and the security key to obtain the data. If the security-protected packet is the integrity-protected packet (i.e., that includes the data and the MAC-I), the UE 102 can determine whether the MAC-I is valid. If the UE 102 confirms that the MAC-I is valid, the UE 102 retrieves the data; otherwise, the UE 102 discards the data. If the security-protected packet is both encrypted and integrity-protected (i.e., that includes encrypted data and an encrypted MAC-I), the UE 102 can decrypt both the encrypted packet and encrypted MAC-I to obtain the data and the MAC-I. The UE 102 then can verify whether the MAC-I is valid for the data. If the UE 102 confirms that the MAC-Iis valid, the UE 102 retrieves and processes the data; otherwise, the UE 102 discards the data.

The base station 104 is equipped with processing hardware 130 that can include one or more general-purpose processors (e.g., CPUs) and a non-transitory computer-readable memory storing instructions that the one or more general-purpose processors execute. Additionally or alternatively, the processing hardware 130 can include special-purpose processing units. The processing hardware 130 in an example implementation includes a MAC controller 132 configured to perform a random access procedure with one or more user devices (e.g., UE 102), receive UL MAC PDUs from the one or more user devices, and transmit DL MAC PDUs to the one or more user devices. The processing hardware 130 can also include a PDCP controller 134 configured to transmit and/or receive PDCP PDUs in accordance with the manner in which the base station 104 can transmit and/or receive DL and/or UL data, respectively. The processing hardware 130 can further include an RRC controller 136 to implement procedures and messaging at the RRC sublayer of the protocol communication stack. The processing hardware 130 in an example implementation includes an RRC inactive controller 138 configured to manage UL and/or DL communications with the one or more UEs operating in the RRC_INACTIVE or RRC_IDLE state. The base station 106 can include processing hardware 140 that is similar to processing hardware 130. In particular, components 142, 144, 146, and 148 can be similar to the components 132, 134, 136, and 138, respectively.

The UE 102 is equipped with processing hardware 150 that can include one or more general-purpose processors such as CPUs and non-transitory computer-readable memory storing machine-readable instructions executable on the one or more general-purpose processors, and/or special-purpose processing units. The processing hardware 150 in an example implementation includes an RRC inactive controller 158 configured to manage UL and/or DL communications when the UE 102 operates in the RRC_INACTIVE or RRC_IDLE state. The processing hardware 150 in an example implementation includes a MAC controller 152 configured to perform a random access procedure with base station 104 or 106, transmit UL MAC PDUs to the base station 104 or 106, and receive DL MAC PDUs from the base station 104 or 106. The processing hardware 150 can also include a PDCP controller 154 configured to transmit and/or receive PDCP PDUs in accordance with the manner in which the UE 102 can transmit and/or receive data in the UL and/or DL direction. The processing hardware 150 can further include an RRC controller 156 to implement procedures and messaging at the RRC sublayer of the protocol communication stack.

Figure 1B:
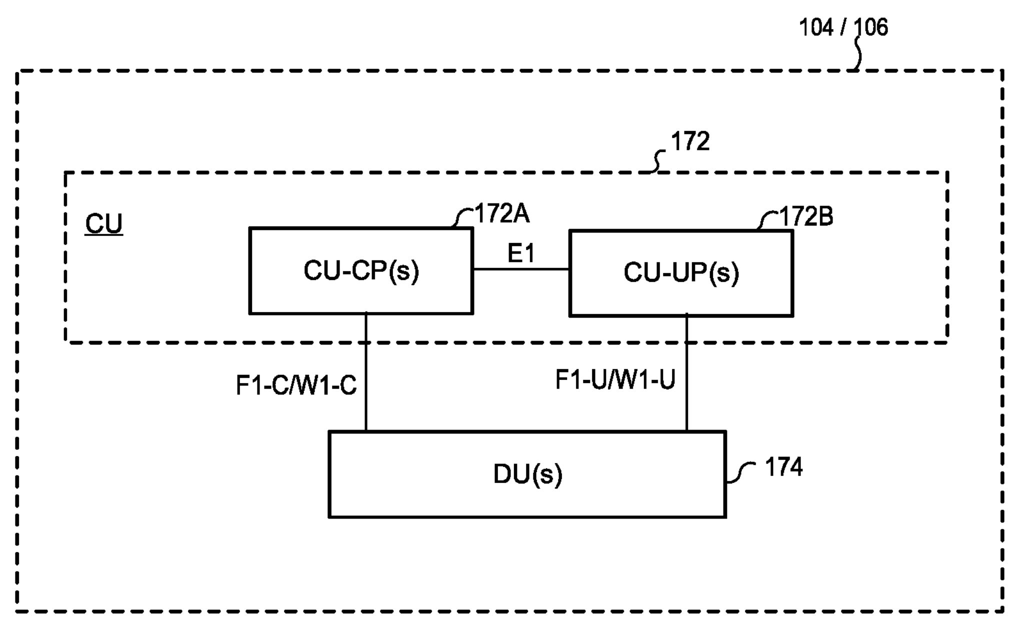
FIG. 1B is a block diagram of an example base station in which a centralized unit (CU) and a distributed unit (DU) that can operate in the system of FIG. 1A.

FIG. 1B depicts an example distributed or disaggregated implementation of any one or more of the base stations 104, 106. In this implementation, each of the base station 104 and/or 106 includes a central unit (CU) 172 and one or more distributed units (DUs) 174. The CU 172 includes processing hardware, such as one or more general-purpose processors (e.g., CPUs) and a computer-readable memory storing machine-readable instructions executable on the general-purpose processor(s), and/or special-purpose processing units. For example, the CU 172 can include a PDCP controller (e.g., PDCP controller 134, 144), an RRC controller (e.g., RRC controller 136, 146), and/or an RRC inactive controller (e.g., RRC inactive controller 138, 148). In some implementations, the CU 172 can include an RLC controller configured to manage or control one or more RLC operations or procedures. In other implementations, the CU 172 does not include an RLC controller.

Each of the DUs 174 also includes processing hardware that can include one or more general-purpose processors (e.g., CPUs) and computer-readable memory storing machine-readable instructions executable on the one or more general-purpose processors, and/or special-purpose processing units. For example, the processing hardware can include a MAC controller (e.g., MAC controller 132, 142) configured to manage or control one or more MAC operations or procedures (e.g., a random access procedure), and/or an RLC controller configured to manage or control one or more RLC operations or procedures. The processing hardware can also include a physical layer controller configured to manage or control one or more physical layer operations or procedures.

In some implementations, the CU 172 can include a logical node CU-CP 172A that hosts the control plane part of the PDCP protocol of the CU 172. The CU 172 can also include logical node(s) CU-UP 172B that hosts the user plane part of the PDCP protocol and/or SDAP protocol of the CU 172. The CU-CP 172A can transmit control information (e.g., RRC messages, F1 application protocol messages), and the CU-UP 172B can transmit data packets (e.g., SDAP PDUs or IP packets).

The CU-CP 172A can be connected to multiple CU-UPs 172B through the E1 interface. The CU-CP 172A selects the appropriate CU-UP 172B for the requested services for the UE 102. In some implementations, a single CU-UP 172B can be connected to multiple CU-CPs 172A through the E1 interface. If the CU-CP 172A and DU(s) 174 belong to a gNB, the CU-CP 172A can be connected to one or more DU 174*s* through an F1-C interface and/or an F1-U interface. If the CU-CP 172A and DU(s) 174 belong to an ng-eNB, the CU-CP 172A can be connected to DU(s) 174 through a W1-C interface and/or a W1-U interface. In some implementations, one DU 174 can be connected to multiple CU-UPs 172B under the control of the same CU-CP 172A. In such implementations, the connectivity between a CU-UP 172B and a DU 174 is established by the CU-CP 172A using Bearer Context Management functions.

Figure 2A:
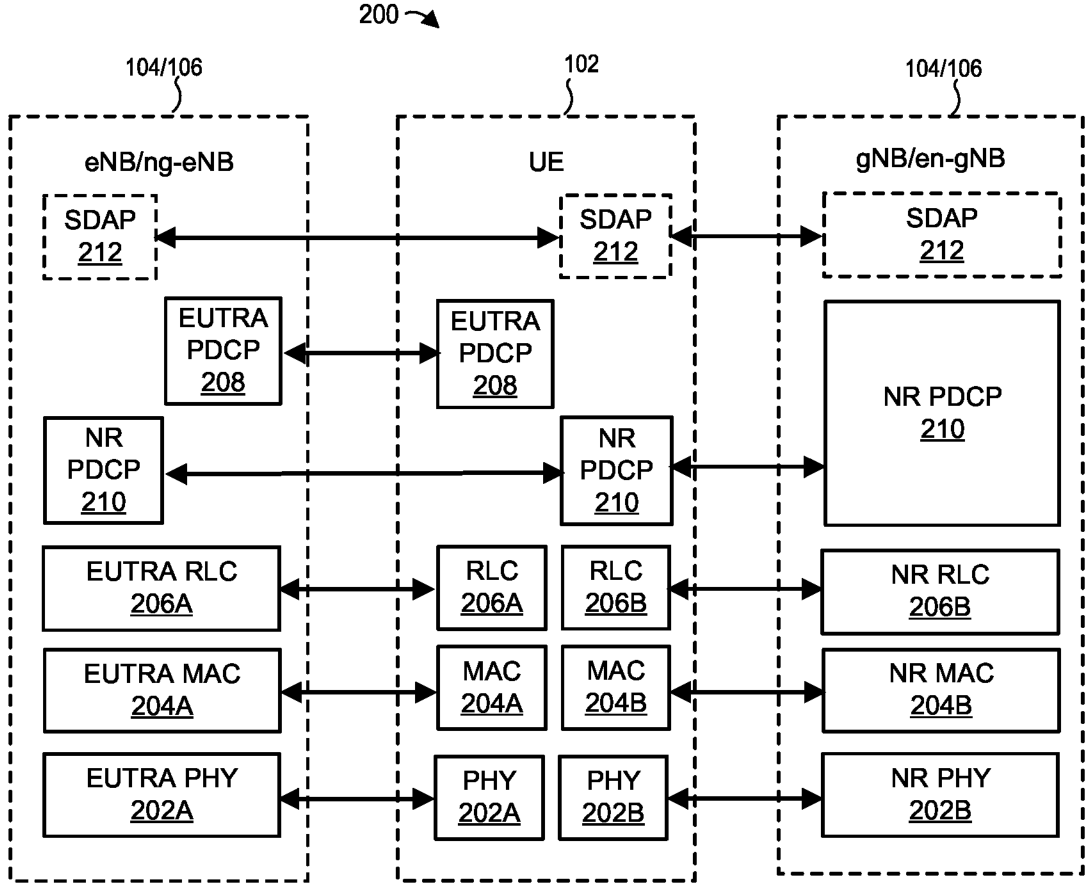
FIG. 2A is a block diagram of an example protocol stack according to which the UE of FIG. 1A communicates with base stations.

FIG. 2A illustrates, in a simplified manner, an example protocol stack 200 according to which the UE 102 can communicate with an eNB/ng-eNB or a gNB (e.g., one or more of the base stations 104, 106).

In the example stack 200, a physical layer (PHY) 202A of EUTRA provides transport channels to the EUTRA MAC sublayer 204A, which in turn provides logical channels to the EUTRA RLC sublayer 206A. The EUTRA RLC sublayer 206A in turn provides RLC channels to a EUTRA PDCP sublayer 208 and, in some cases, to an NR PDCP sublayer 210. Similarly, the NR PHY 202B provides transport channels to the NR MAC sublayer 204B, which in turn provides logical channels to the NR RLC sublayer 206B. The NR RLC sublayer 206B in turn provides data transfer services to the NR PDCP sublayer 210. The NR PDCP sublayer 210 in turn can provide data transfer services to the SDAP sublayer 212 or an RRC sublayer (not shown in FIG. 2A). The UE 102, in some implementations, supports both the EUTRA and the NR stack as shown in FIG. 2A, to support handover between EUTRA and NR base stations and/or to support dual connectivity (DC) over EUTRA and NR interfaces. Further, as illustrated in FIG. 2A, the UE 102 can support layering of NR PDCP 210 over EUTRA RLC 206A, and SDAP sublayer 212 over the NR PDCP sublayer 210.

The EUTRA PDCP sublayer 208 and the NR PDCP sublayer 210 receive packets (e.g., from an IP layer, layered directly or indirectly over the PDCP layer 208 or 210) that can be referred to as SDUs, and output packets (e.g., to the RLC layer 206A or 206B) that can be referred to as PDUs. Except where the difference between SDUs and PDUs is relevant, this disclosure for simplicity refers to both SDUs and PDUs as "packets."

On a control plane, the EUTRA PDCP sublayer 208 and the NR PDCP sublayer 210 can provide signaling radio bearers (SRBs) to the RRC sublayer (not shown in FIG. 2A) to exchange RRC messages or NAS messages, for example. On a user plane, the EUTRA PDCP sublayer 208 and the NR PDCP sublayer 210 can provide data radio bearers (DRBs) to support data exchange. Data exchanged on the NR PDCP sublayer 210 can be SDAP PDUs, IP packets, or Ethernet packets.

Figure 2B:
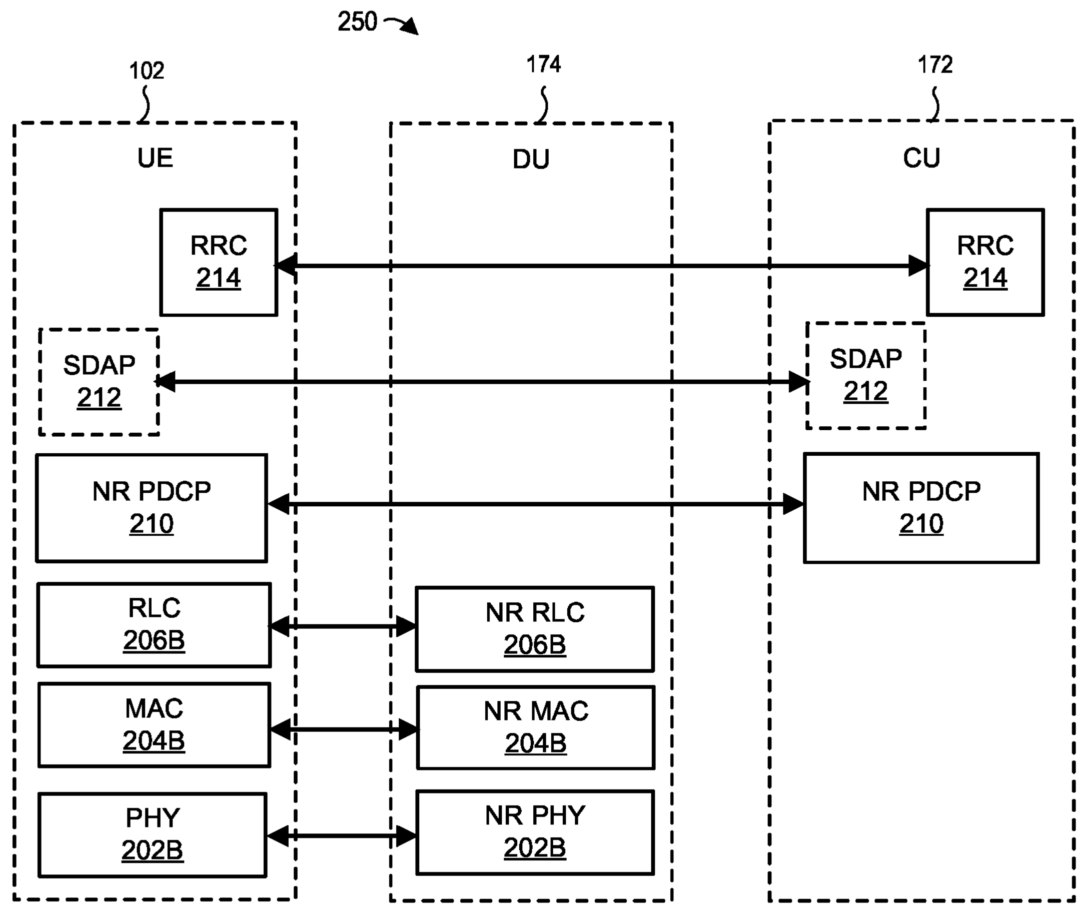
FIG. 2B is a block diagram of an example protocol stack according to which the UE of FIG. 1A communicates with a CU and a DU.

Thus, it is possible to functionally split the radio protocol stack, as shown by the radio protocol stack 250 in FIG. 2B. The CU at any of the base stations 104 or 106 can hold all the control and upper layer functionalities (e.g., RRC 214, SDAP 212, NR PDCP 210), while the lower layer operations (e.g., NR RLC 206B, NR MAC 204B, and NR PHY 202B) are delegated to the DU. To support connection to a 5GC, NR PDCP 210 provides SRBs to RRC 214, and NR PDCP 210 provides DRBs to SDAP 212 and SRBs to RRC 214.

Next, several example scenarios that involve several components of FIG. 1A and relate to performing random access procedure(s) and communicating data in an inactive or idle state are discussed next with reference to FIGS. 3A-5. To simplify the following description, the "inactive state" is used to represent either the inactive (e.g., RRC_INACTIVE) or idle (e.g., RRC_IDLE) state, unless otherwise noted.

Figure 3A:
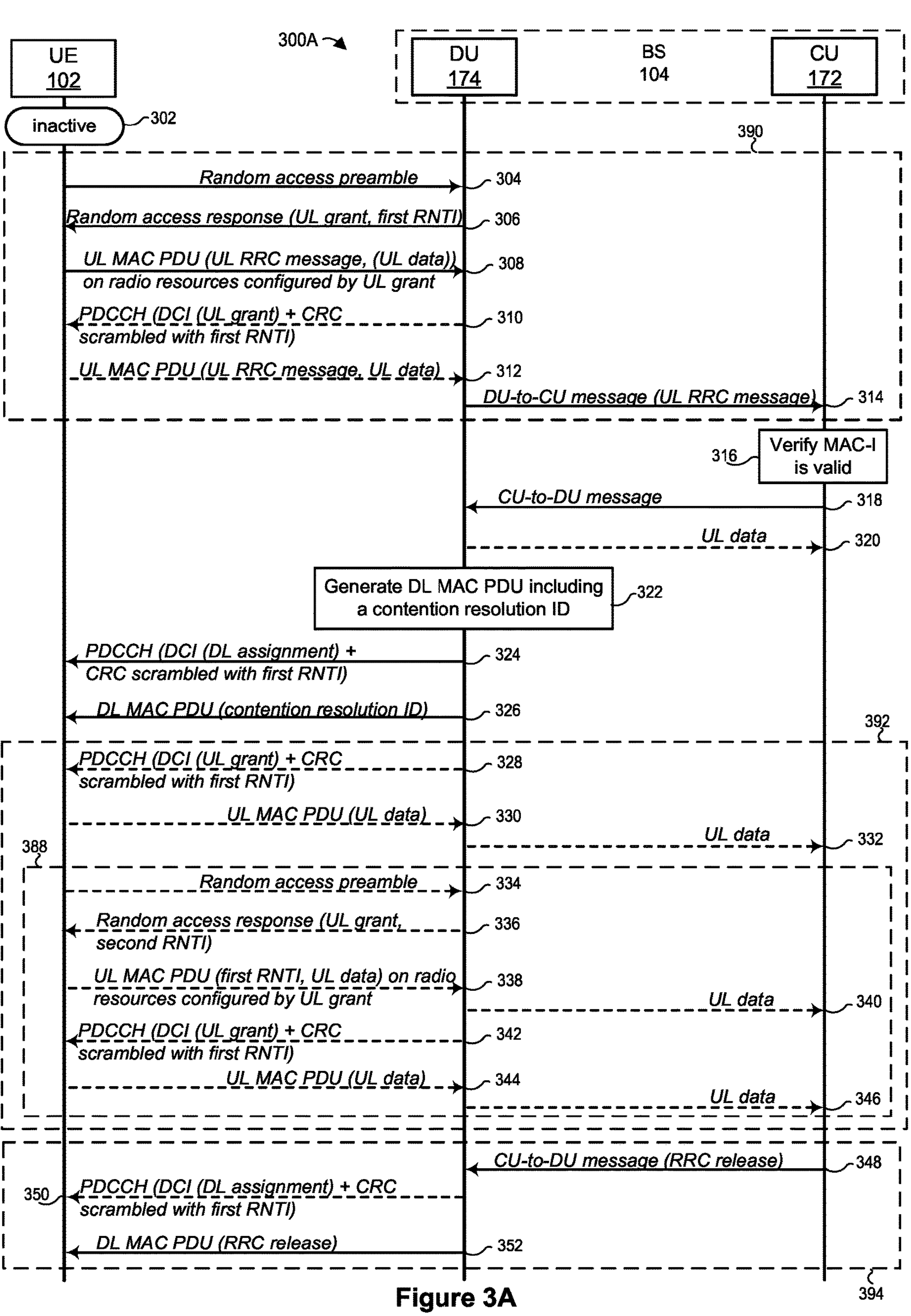
FIG. 3A is an example message sequence in which a DU and CU included in a distributed base station of FIG. 1A or FIG. 1B perform a 4-step random access procedure for early data communication with the UE of FIG. 1A operating in an inactive state.

Referring first to FIG. 3A, in a scenario 300A, the UE 102 initially operates 302 in an inactive state with the base station 104 that includes a CU 172 and a DU 174. The UE 102 can initiate early data communication in order to transmit at least one UL data packet or to receive at least one DL data packet. In cases where the UE 102 initiates early data transmission (EDT) to transmit UL data while the UE 102 operates in the inactive state, the initial early data communication can be mobile originating (MO) EDT. In cases where the UE 102 initiates early data communication to receive DL data while the UE 102 operates in the inactive state, the initial early data communication can be mobile terminating (MT) EDT (i.e., early data reception from the viewpoint of the UE 102). In such MO EDT or MT EDT cases, the UE 102 at event 302 receives, from the DU 174, a paging message that includes a UE ID of the UE 102 and an EDT indication. For example, the UE ID can be an I-RNTI, resume ID, or a NAS ID (e.g., S-TMSI or 5G-S-TMSI, or a specific ID for MT EDT). In response to the paging message (i.e., the UE ID and the EDT indication), the UE 102 initiates an early data communication procedure 390 to transmit UL data and/or receive DL data to/from the DU 174 and CU 172.

Particularly, in initiating the early data communication procedure 390, the UE 102 begins a random access procedure by transmitting 304 a (first) random access preamble to the DU 174. In response, the DU 174 transmits 306 a (first) random access response that includes a (first) UL grant and a (first) RNTI (e.g., a (temporary) C-RNTI)). In some implementations, the DU 174 can include an ID of the random access preamble and/or a timing advance command in the random access response.

After receiving the random access response, and in accordance with the first UL grant (e.g., on radio resources configured by the first UL grant), the UE 102 transmits 308 to the DU 174 an initial UL MAC PDU (or a first HARQ transmission of the initial UL MAC PDU). In some implementations, the UE 102 can include a UL RRC message in the initial UL MAC PDU. The UL RRC message can include a UE ID of the UE 102, such as an I-RNTI, resume ID, or a NAS ID. In some implementations, in accordance with the timing advance command received in the random access response, the UE 102 can adjust UL transmission timing and transmit the initial UL MAC PDU with the adjusted UL transmission timing. In some implementations, the UE 102 can include initial UL data in the initial UL MAC PDU in addition to the UL RRC message to perform an MO EDT. In other implementations, the UE 102 may or may not include the initial UL data in the initial UL MAC PDU in addition to the UL RRC message to perform an MT EDT. In some implementations, the UE 102 includes a MAC-I (e.g., resumeMAC-I field or ResumeMAC-I information element (IE)) in the UL RRC message.

The DU 174 attempts to receive 308 the initial UL MAC PDU. If the DU 174 fails to receive the initial UL MAC PDU, the DU 174 can generate a DCI, generate a CRC from the DCI, scramble the CRC with the first RNTI, and transmit 310 the DCI and the scrambled CRC on a PDCCH to the UE 102. In some implementations, the DU 174 includes a (second) UL grant in the DCI. After receiving the DCI, and in accordance with the second UL grant (e.g., on radio resources configured by the second UL grant), the UE 102 transmits 312 to the DU 174 the initial UL MAC PDU (or a second HARQ transmission of the initial UL MAC PDU). In turn, the DU 174 attempts to receive 312 the initial UL MAC PDU. If the DU 174 again fails to obtain the initial UL MAC PDU, e.g., from the second HARQ transmission or a combination of the first and second HARQ transmissions, the DU 174 can transmit a subsequent DCI to the UE 102, similar to event 310. In turn, in accordance with the subsequent DCI, the UE 102 can transmit the initial UL MAC PDU (or a third HARQ transmission of the initial UL MAC PDU), similar to events 308 and 312 respectively. In some implementations, the DU 174 can transmit additional DCI(s) to instruct the UE 102 to transmit additional HARQ transmission(s) until the DU 174 successfully receives the initial UL MAC PDU.

When the DU 174 successfully receives the initial UL MAC PDU from the UE 102, e.g., in event 308 and/or event 312, the DU 174 can send 314 a (first) DU-to-CU message (e.g., Initial UL RRC Message Transfer message) that includes the UL RRC message to the CU 172. The events 302, 304, 306, 308, 310, 312 and 314 are collectively referred to in FIG. 3A as the initial early data communication procedure 390. The UE 102 can initiate the initial early data communication procedure 390 to perform an early data communication 392 with the base station 104, as will be described in further detail below.

In some implementations, after receiving the first DU-to-CU message, the CU 172 can verify 316 whether the MAC-I included in the UL RRC message is valid. If the CU 172 verifies that the MAC-I is valid, the CU 172 sends 318 a (first) CU-to-DU message to the DU 174. In some scenarios or implementations, the CU 172 can include DL data in the first CU-to-DU message if the CU 172 has DL data to transmit to the UE 102. In these implementations, after receiving the first CU-to-DU message, the DU 174 generates 322 a DL MAC PDU that includes the DL data. In other scenarios or implementations, the CU 172 does not include DL data in the first CU-to-DU message if the CU 172 has no DL data to transmit to the UE 102. In these implementations, after receiving the first CU-to-DU message, the DU 174 generates 322 a DL MAC PDU that does not include DL data. In some implementations, the first CU-to-DU message can be an existing F1 application protocol (F1AP) message or a W1 application protocol message (W1AP) (e.g., DL RRC Message Transfer message, UE Context Setup Request message, or UE Context Modification Request message). In other implementations, the first CU-to-DU message can be a new F1AP message or a new W1AP message specific for early data communication. In some implementations, the DU 174 can send a (second) DU-to-CU message (not shown in FIG. 3A) in response to the first CU-to-DU message. The second DU-to-CU message can be a UE Context Setup Response message, UE Context Modification Response message, a new F1AP message, or a new W1AP message.

If the CU 172 determines that the MAC-I is invalid at event 316, the CU 172 can send a (second) CU-to-DU message (not shown in FIG. 3A), such as a DL RRC Message Transfer message, to the DU 174 instead of the first CU-to-DU message. In some implementations, the CU 172 can include a DL RRC message in the second CU-to-DU message. The DU 174 can retrieve the DL RRC message from the second CU-to-DU message and include the retrieved DL RRC message in the DL MAC PDU at event 322. When the UE 102 eventually receives the DL RRC message, the UE 102 may transition into a certain state depending on the DL RRC message. For example, if the DL RRC message is an RRC setup message (e.g., RRCSetup message or RRCConnectionSetup message), the UE 102 transitions to a connected state (e.g., RRC_CONNECTED). In another example, if the DL RRC message is an RRC Reject message (e.g., RRCReject or RRCConnectionReject message), the UE 102 either transitions to an idle state (e.g., RRC_IDLE) from the inactive state (e.g., RRC_INACTIVE) or remains in the inactive state. In this particular example in which the DU 174 receives the second CU-to-DU message that includes the RRC Reject message, the DU 174 can refrain from transmitting to the UE 102 a DCI for UL transmission, so that the UE 102 is not scheduled to transmit a UL MAC PDU for EDT.

In some implementations, after receiving 318 the first CU-to-DU message, the DU 174 sends 320 any initial UL data that was received from the UE 102 (e.g., in events 308, 312) to the CU 172. In alternative embodiments, the DU 174 can include any initial UL data in the first DU-to-CU message at event 314, and thus event 320 can be omitted. To send 320 the initial UL data to the CU 172, the DU 174 in some implementations can generate a (first) tunnel packet (e.g., GPRS Tunnel Protocol User Plane (GTP-U) packet) that includes the initial UL data and a first tunnel endpoint ID (TEID) and send 320 the first tunnel packet to the CU 172. In some implementations, the first TEID is included in the first CU-to-DU message at event 318. In other implementations, the CU 172 can send another CU-to-DU message that includes the first TEID to the DU 174 after receiving 314 the first DU-to-CU message or transmitting 318 the first CU-to-DU message.

As described above, after or in response to receiving 318 the first CU-to-DU message, the DU 174 generates 322 a DL MAC PDU. In some implementations of completing the random access procedure initiated by the UE at event 304, the DL MAC PDU includes a contention resolution ID that is transmitted to the UE 102 by the DU 174. The contention resolution ID can be a MAC control element (CE), and the DU 174 can include a MAC subheader for the MAC CE in the DL MAC PDU. In some implementations, the DU 174 can include other MAC CE(s) and a particular MAC subheader for each of the MAC CE(s) in the DL MAC PDU. These other MAC CE(s) can include a Semi-Persistent (SP) CSI-RS/CSI-IM Resource Set Activation/Deactivation MAC CE, Aperiodic CSI Trigger State Subselection MAC CE, (Enhanced) TCI States Activation/Deactivation for UE-specific PDSCH MAC CE, TCI State Indication for UE-specific PDCCH MAC CE, or SP CSI reporting on PUCCH Activation/Deactivation MAC CE. In other implementations, the DU 174 does not include a MAC CE other than the contention resolution ID in the DL MAC PDU. In yet other implementations, the DU 174 can include, in the DL MAC PDU, a MAC subPDU or a RLC PDU which does not include DL data. In yet other implementations, the DU 174 neither includes a MAC subPDU nor a RLC PDU in the DL MAC PDU.

To transmit 326 the DL MAC PDU to the UE 102, the DU 174 generates a (first) DCI that includes a DL assignment, generates a CRC from the first DCI, scrambles the CRC with the first RNTI, and transmits 324 the first DCI and the scrambled CRC on a PDCCH to the UE 102. Then, and in accordance with the DL assignment, the DU 174 transmits 326 the DL MAC PDU (or a first HARQ transmission of the DL MAC PDU) to the UE 102. In some implementations, the DU 174 can send 320 initial UL data that was received from the UE 102 (e.g., in events 308, 312) to the CU 172 after event 322, 324 or 326. In some implementations, the DU 174 can generate 322 the DL MAC PDU before receiving 318 the CU-to-DU message and delays transmitting the DL MAC PDU to the UE 102 until receiving 318 the CU-to-DU message.

When the UE 102 in the inactive state receives 324 the first DCI and the scrambled CRC of the first DCI on the PDCCH, the UE 102 determines that the first DCI is addressed to the UE 102 in accordance with the scrambled CRC and the first RNTI. In response to the determination, the UE 102 attempts to receive 326 the DL MAC PDU in accordance with the first DCI. If the UE 102 fails to receive the DL MAC PDU from the first HARQ transmission, the UE 102 can transmit a HARQ negative acknowledge (NACK) to the DU 174 to indicate that the UE 102 failed to receive the DL MAC PDU. In response to the HARQ NACK, the DU 174 can transmit a subsequent DCI and the DL MAC PDU again (or a second HARQ transmission of the DL MAC PDU) to the UE 102, similar to events 324 and 326. If the UE 102 successfully receives 326 the DL MAC PDU from either the first HARQ transmission or a combination of the first and second HARQ transmissions, the UE 102 can transmit a HARQ acknowledge (ACK) to the DU 174.

After the DU 174 receives the HARQ ACK, the DU 174 can generate a (second) DCI, generate a CRC from the second DCI, scramble the CRC with the first RNTI, and transmit 328 the second DCI and the scrambled CRC on a PDCCH to the UE 102. In some implementations, the DU 174 transmits the second DCI and the scrambled CRC to the UE 102 when the DU 174 determines that the UE 102 has UL data to transmit for EDT. For example, the UE 102 can include a buffer status report in the initial UL MAC PDU (e.g., in events 308, 312) to indicate to the DU 174 that the UE 102 has UL data to transmit. In another example, the UE 102 can indicate that the UE 102 has UL data to transmit in the UL RRC message (e.g., in event 312), and the CU 172 can indicate to the DU 174 that the UE 102 has UL data to transmit in the first CU-to-DU message in event 318. In some implementations, the CU 172 can implicitly indicate to the DU 174 that the UE 102 has UL data to transmit using the first CU-to-DU message. In this case, the first CU-to-DU message may not be a UE Context Release Command message that is typically used for requesting the DU 174 to release a UE Context of the UE 102. In other implementations, the CU 172 can explicitly include an indication in the first CU-to-DU message to indicate to the DU 174 that the UE 102 has UL data to transmit.

When the UE 102 in the inactive state receives 328 the second DCI and the scrambled CRC of the second DCI on the PDCCH, the UE 102 determines that the second DCI is addressed to the UE 102 in accordance with the scrambled CRC and the first RNTI.

In some implementations, the DU 174 includes a UL grant in the second DCI at event 328. After receiving the second DCI, and in accordance with the UL grant, the UE 102 transmits 330 to the DU 174 a subsequent UL MAC PDU that includes UL data (or a HARQ transmission of the subsequent UL MAC PDU). That is, the UE 102 may have initial UL data to transmit (e.g., if the UE 102 did not have initial UL data to transmit at event 308 or 312), or the UE 102 may have subsequent (second) UL data to transmit, such as a second UL data packet that is different than the initial UL data packet transmitted at event 308). In any case, the DU 174 can prolong early data communication 392 that was initiated by the UE 102 in event 390. In cases the DU 174 receives the subsequent UL MAC PDU, the DU 174 retrieves the UL data from the subsequent UL MAC PDU and can transmit 332 the UL data to the CU 172. To send 332 the UL data to the CU 172, the DU 174 in some implementations can generate a second tunnel packet (e.g., GTP-U packet) that includes the UL data and the first TEID and send 332 the second tunnel packet to the CU 172.

In other implementations, the DU 174 includes a DL assignment in the second DCI at event 328, and transmits a subsequent DL MAC PDU, which in some implementations, can include (second) DL data, to the UE 102 in accordance with the second DCI (not shown in FIG. 3A). The DU 174 can receive DL data from the CU 172, which received the DL data from the CN 110. When the CU 172 sends the DL data to the DU 174, the CU 172 can generate a third tunnel packet (e.g., GTP-U packet) that includes the DL data and a second TEID, and send the third tunnel packet to the DU 174. The second TEID can be included in the first or second DU-to-CU messages described above. In other implementations, the DU 174 can send another DU-to-CU message that includes the second TEID to the CU 172 after transmitting 314 the first DU-to-CU message, receiving 318 the first CU-to-DU message, or transmitting the second DU-to-CU message. In any event, in accordance with the DL assignment, the UE 102 attempts to receive the subsequent DL MAC PDU (or a first HARQ transmission of the subsequent DL MAC PDU). If the UE 102 fails to receive the subsequent DL MAC PDU from the first HARQ transmission, the UE 102 can transmit a HARQ NACK to the DU 174 to indicate that the UE 102 failed to receive the subsequent DL MAC PDU. In response to the HARQ NACK, the DU 174 can transmit a (subsequent) DCI and the subsequent DL MAC PDU (or a second HARQ transmission of the subsequent DL MAC PDU) to the UE 102, similar to events 324 and 326, except the subsequent DL MAC PDU does not include a contention resolution ID. If the UE 102 successfully receives the subsequent DL MAC PDU from the first HARQ transmission or a combination of the first and second HARQ transmissions, the UE 102 can transmit a HARQ ACK to the DU 174. The UE 102 can then retrieve the DL data from the subsequent DL MAC PDU if any.

After receiving the DL MAC PDU, the second DCI, or transmitting the subsequent UL MAC PDU in events 326, 328, and 330 respectively, the UE 102 can initiate 388 a random access procedure to transmit UL data, in some implementations. That is, the UE 102 may have additional (third) UL data to transmit after already having transmitted either initial UL data at event 330 or after having transmitted initial UL data at either event 308 or 312 and second UL data at event 330. In one such implementation, the UE 102 may determine to initiate 388 the random access procedure because the UE 102 does not have a UL grant to transmit UL data. The UE 102 can initiate a scheduling request (SR) to request the DU 174 to provide a UL grant to the UE 102, and in response to the SR initiation, the UE 102 can initiate 388 the random access procedure. In the random access procedure 388, the UE 102 transmits 334 a (second) random access preamble to the DU 174. In response, the DU 174 transmits 336 a (second) random access response that includes a (third) UL grant and a (second) RNTI (e.g., a (temporary) C-RNTI)) to the UE 102. In some implementations, the DU 174 can include an ID of the second random access preamble and/or a second timing advance command in the second random access response. After receiving the second random access response, and in accordance with the third UL grant (e.g., on radio resources configured by the third UL grant), the UE 102 transmits 338 to the DU 174 a third UL MAC PDU (or a first HARQ transmission of the third UL MAC PDU). In some implementations, the third UL MAC PDU includes the first RNTI and the third UL data. In some implementations, in accordance with the second timing advance command, the UE 102 can adjust UL transmission timing and transmit the third UL MAC PDU with the adjusted UL transmission timing.

The DU 174 attempts to receive 338 the third UL MAC PDU. If the DU 174 fails to receive the third UL MAC PDU, the DU 174 can generate a third DCI, generate a CRC from the third DCI, scramble the CRC with the first RNTI, and transmit the third DCI and the scrambled CRC on a PDCCH to the UE 102, similar to event 310. In some implementations, the DU 174 includes a (fourth) UL grant in the third DCI. When the UE 102 in the inactive state receives the third DCI and the scrambled CRC of the third DCI on the PDCCH, the UE 102 determines that the third DCI is addressed to the UE 102 in accordance with the scrambled CRC and the first RNTI. In response to the determination, the UE 102 transmits the third UL MAC PDU (or a second HARQ transmission of the third UL MAC PDU) to the DU 174 in accordance with the fourth UL grant, similar to event 312. In turn, the DU 174 attempts to receive the third UL MAC PDU. If the DU 174 fails to obtain the third UL MAC PDU, e.g., from the second HARQ transmission or a combination of the first and second HARQ transmissions, the DU 174 can transmit a subsequent DCI to the UE 102. In turn, in accordance with the subsequent DCI, the UE 102 can transmit the third UL MAC PDU (or a third HARQ transmission of the third UL MAC PDU), similar to events 308 and 312. In some implementations, the DU 174 can transmit additional DCI(s) to instruct the UE 102 to transmit additional HARQ transmission(s) until the DU 174 successfully receives the third UL MAC PDU.

After successfully receiving the third UL MAC PDU, the DU 174 can retrieve the first RNTI and the third UL data from the third UL MAC PDU, and, in accordance with the first RNTI, further determine that the third UL data belongs to the UE 102. In response to the determination, the DU 174 can transmit 340 the third UL data to the CU 172. To send 340 the third UL data to the CU 172, the DU 174 in some implementations can generate a fourth tunnel packet (e.g., GTP-U packet) that includes the third UL data and the first TEID and send 340 the fourth tunnel packet to the CU 172. In some implementations, the DU 174 can associate the first TEID with the first C-RNTI, and the DU 174 can determine or identify the first TEID in accordance with the association.

After receiving 338 the third UL MAC PDU, the DU 174 can transmit 342 a (fourth) DCI with a scrambled CRC of the fourth DCI on a PDCCH to the UE 102 to schedule the UE 102 to transmit or receive a MAC PDU, similar to event 328. In some implementations, if the fourth DCI includes a UL grant, the UE 102 can transmit 344 a fourth UL MAC PDU that includes UL data to the DU 174 in accordance with the UL grant (e.g., on radio resources configured by the UL grant), similar to event 330. That is, the UE 102 may have third UL data to transmit (e.g., if the UE 102 did not have third UL data to transmit at event 338), or the UE 102 may have subsequent (fourth) UL data to transmit, such as a fourth UL data packet that is different than the third UL data packet transmitted at event 338. After receiving the fourth UL MAC PDU, the DU 174 retrieves the UL data from the fourth UL MAC PDU and can send 346 the UL data to the CU 172. To send 346 the UL data to the CU 172, the DU 174 in some implementations can generate a fifth tunnel packet (e.g., GTP-U packet) that includes the UL data and the first TEID and sends 346 the fifth tunnel packet to the CU 172.

In some implementations, the DU 174 transmits 342 the fourth DCI and the scrambled CRC to the UE 102 when the DU 174 determines that the UE 102 has UL data to transmit. For example, the UE 102 can include a buffer status report in the third UL MAC PDU to indicate to the DU 174 whether the UE 102 has UL data to transmit. In other implementations, if the fourth DCI includes a DL assignment, the DU 174 transmits a third DL MAC PDU that includes (third) DL data to the UE 102 in accordance with the DL assignment, similar to event 328. Correspondingly, the UE 102 can receive the third DL MAC PDU from the DU 174 in accordance with the DL assignment.

The events 334, 336, 338, 340, 342, 344 and 346 are collectively referred to in FIG. 3A as a random access procedure 388. The events 328, 330, 332, and 388 are collectively referred to in FIG. 3A as the early data communication 392.

After a certain period of data inactivity for the UE 102, the CU 172 can determine that neither the CU 172 nor the UE 102 has transmitted any data in the DL direction or the UL direction. In some implementations, the CU 172 determines data inactivity of the UE 102 based on a (third) DU-to-CU message (not shown in FIG. 3A) indicating data inactivity of the UE 102 received from the DU 174. After the determination, the CU 172 can generate an RRC release message (e.g., RRCRelease message or RRCConnectionRelease message) to instruct the UE 102 to transition to or remain in the inactive state, and subsequently send 348 a (third) CU-to-DU message that includes the RRC release message to the DU 174. In some implementations, the RRC release message may include an I-RNTI or a resume ID of the UE 102, a paging cycle configuration, a RAN notification area (RNA) configuration, a periodic RNA update timer value, and/or a next hop chain count value. In turn, the DU 174 retrieves the RRC release message from the third CU-to-DU message for transmission to the UE 102. To transmit the RRC release message, in some implementations, the DU 174 can generate a (fifth) DCI that includes a DL assignment, generate a CRC from the fifth DCI, scramble the CRC with the first RNTI, and transmit 350 the fifth DCI and the scrambled CRC on a PDCCH to the UE 102, similar to event 324. Subsequently, in accordance with the DL assignment in the fifth DCI, the DU 174 transmits 352 a fourth DL MAC PDU that includes the RRC release message to the UE 102, similar to event 326, except the fourth DL MAC PDU does not include a contention resolution ID. After receiving the RRC release message, the UE 102 transitions to or remains in the inactive state and continues to operate 302 in the inactive state. The events 348, 350 and 352 are collectively referred to in FIG. 3A as an early data communication release procedure 394.

In some implementations, the UL data or DL data described above includes PDCP PDU(s), RLC PDU(s), RRC PDU(s), NAS PDU(s), and/or IP packet(s) associated to SRB(s), DRB(s) and/or QoS flow(s). In cases the UL data are RLC control PDU(s), the DU 174 processes the RLC control PDU(s) instead of sending the UL data to the CU 172. In some implementations, the DU 174 generates the DL data (e.g., RLC control PDU(s)) instead of receiving the DL data from the CU 172. In other implementations, the UL or DL data described above includes user-plane data and/or control-plane data. The user-plane data includes Internet of things (IOT) data, Ethernet traffic data, Internet traffic data, or a short message service (SMS) message. The control-plane data includes RRC message(s) and/or NAS message(s). The RRC PDU(s) can be a UL-CCCH-Message, UL-DCCH-Message, DL-CCCH-Message, DL-DCCH-Message, and in some implementations, can include a UL RRC message or a DL RRC message.

Figure 3B:
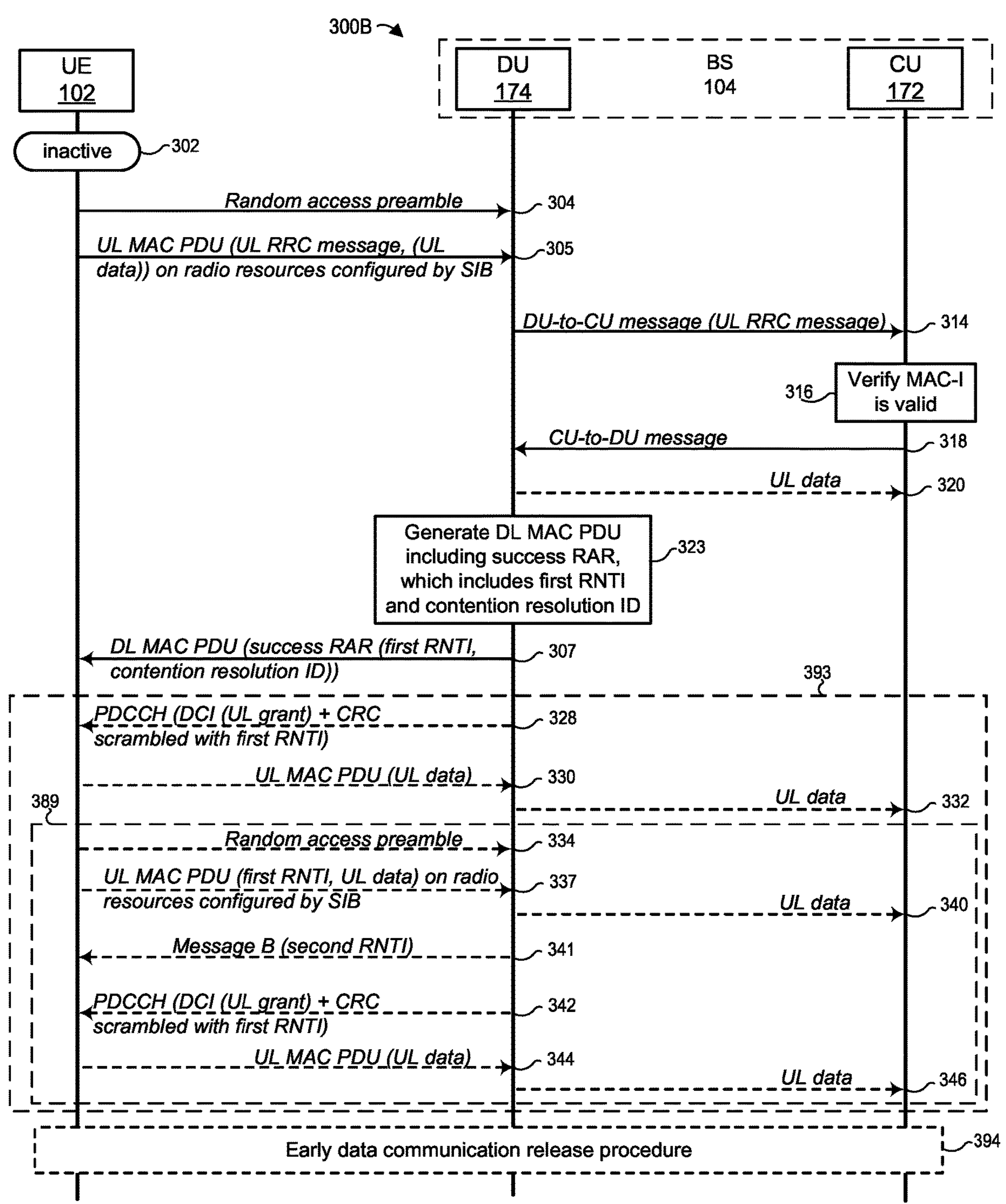
FIG. 3B is an example message sequence in which a DU and CU included in a distributed base station of FIG. 1A or FIG. 1B perform a 2-step random access procedure for early data communication with the UE of FIG. 1A operating in an inactive state.

As illustrated in the scenario 300A, the random access procedure that the UE 102 performs with the base station 104 when initiating the initial early data communication procedure 390 is a four-step random access procedure, where the four steps of the random access procedure correspond to events 304, 306, 308, and 326. In other alternative implementations, the UE 102 can perform a two-step random access procedure instead of the four-step random access procedure. FIG. 3B illustrates a scenario 300B, which is similar to the scenario 300A, except that the UE 102 performs a two-step random access procedure with the base station 104 when initiating the initial early data communication procedure 390.

To initiate the two-step random access procedure, the UE 102 transmits 304 a random access preamble to the DU 174 and then transmits 305 an initial UL MAC PDU including a UL RRC message to the DU 174. The UL MAC PDU can include a UL data packet. In some implementations, prior to the event 304, the UE 102 may receive configuration(s) of the two-step random access procedure in an RRC message that causes the UE to transition to the inactive state. In some implementations, prior to event 304, the DU 174 broadcasts a system information block (SIB) on the cell 124 and the UE 102 receives the SIB on the cell 124. The SIB includes configuration(s) for the UE 102 to perform a two-step random access procedure on the cell 124. The UE 102 transmits the random access preamble and the initial UL MAC PDU on radio resources indicated by the configuration(s) in events 304 and 305, respectively. The events 304 and 305 may collectively be referred to as a "Message A" of the two-step random access procedure. The random access preamble and the payload are two parts of the Message A that are sent at different occasions. For example, the UE 102 can transmit 304 the random access preamble via a Physical Random Access Channel (PRACH) occasion, and transmit 305 the payload via a Physical Uplink Shared Channel (PUSCH) occasion.

In response to successfully receiving 305 the initial UL MAC PDU from the UE 102, the base station 104 proceeds to performing events 314, 316, 318 and 320 as described above in scenario 300A. In response to receiving 318 the CU-to-DU message, the DU 174 generates 323 a DL MAC PDU that includes a success Random Access Response (RAR) (e.g., successRAR MAC subheader and a successRAR MAC subPDU), which indicates that the DU 174 successfully received 305 the UL MAC PDU. The success RAR includes a contention resolution ID, timing advance command, and the first RNTI. The success RAR can further include a PUCCH Resource Indicator, HARQ Feedback Timing Indicator, Transmit Power Control (TPC) command, and/or channel access type and CP extension. After generating the DL MAC PDU, the DU 174 sends 307 the DL MAC PDU to the UE 102. Event 307 may be referred to as a "Message B" of the two-step random access procedure.

After sending 307 the DL MAC PDU to the UE 102, the UE 102 and the base station 104 can proceed to perform an early data communication 393, similar to early data communication 392. Whereas in some implementations the UE 102 and the base station 104 of scenario 300A perform a four-step random access procedure 388 during the early data communication 392, in alternative implementations, the UE 102 and the base station 104 can perform a two-step random access procedure 389 during the early data communication 393, as illustrated in scenario 300B. Similar to the two-step random access procedure described above when the UE 102 initiates the initial early data communication procedure, the UE 102 can initiate the two-step random access procedure 389 by transmitting 334 a random access preamble to the DU 174 and transmitting 337 a UL MAC PDU including the first RNTI to the DU 174 on radio resources allocated by the base station 104 via the configuration(s). The events 334 and 337 may collectively be referred to as a "Message A" of the two-step random access procedure 389. In addition, the DU 174 can send 341 a Message B that includes a second RNTI to the UE 102. If the UL MAC PDU at event 337 includes a UL data packet, the DU 174 may send 340 the UL data packet to the CU 172.

The DU 174 attempts to receive 337 the UL MAC PDU. If the DU 174 successfully receives the UL MAC PDU, the DU 174 can retrieve the first RNTI and the UL data (if any) from the UL MAC PDU, and, in accordance with the first RNTI, further determine that the UL data belongs to the UE 102. In response to the determination, the DU 174 can transmit 340 the UL data to the CU 172. If the DU 174 fails to receive the UL MAC PDU, the DU 174 can proceed to events 342, 344, and 346, as described above in scenario 300A.

Subsequent to early data communication 393, and after a certain period of data inactivity for the UE 102, the CU 172 can perform the early data communication release procedure 394.

Figure 3C:
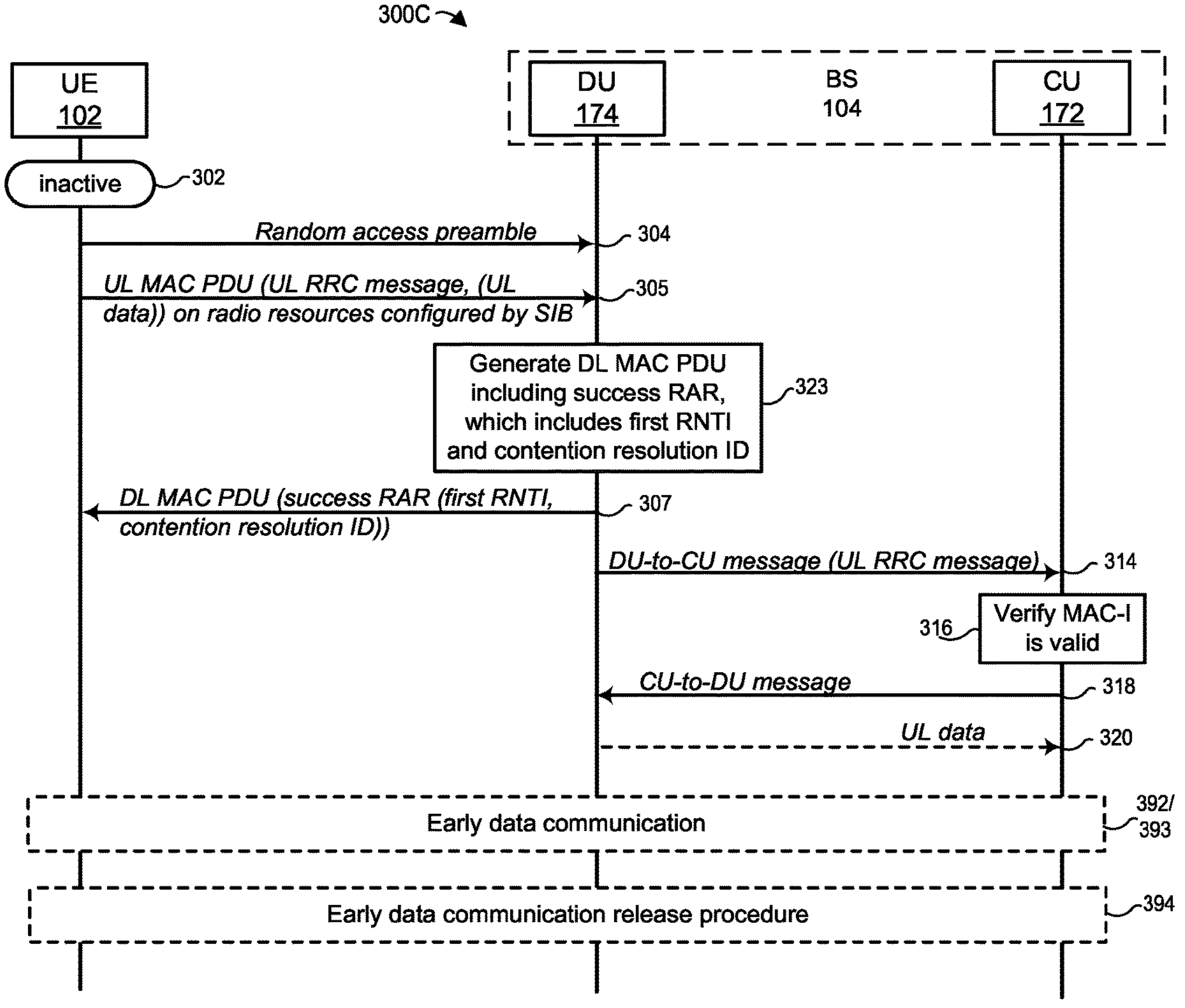
FIG. 3C is an example message sequence similar to the message sequence of FIG. 3B, but where the DU performs the 2-step random access procedure without any instructions from the CU.

Turning to FIG. 3C, a scenario 300C is initially similar to scenario 300B in events 302, 304, and 305. However, after receiving 305 the UL MAC PDU, whereas the DU 174 of scenario 300B delays generating and sending a DL MAC PDU in events 323 and 307 respectively until receiving 318 a CU-to-DU message from the CU 172, the DU 174 of scenario 300C generates 323 the DL MAC PDU in response to receiving 305 the UL MAC PDU. Subsequently, the DU 174 transmits 307 the DL MAC PDU to the UE 102.

After receiving 305 the UL MAC PDU, generating 323 the DL MAC PDU or transmitting 307 the DL MAC PDU, the DU 174 can transmit 314 a DU-to-CU message that includes the UL RRC message to the CU 172. The CU 174 can then verify 316 that the MAC-I included in the UL RRC message is valid, transmit 318 a CU-to-DU message to the DU 174, and, in implementations in which the UL MAC PDU at event 308 includes UL data, receive 320 UL data. After the DU 174 receives the HARQ ACK, the DU 174 can initiate early data communication 392 or 393, in some implementations.

After a certain period of data inactivity for the UE 102, the CU 172 can perform the early data communication release procedure 394.

Figure 3D:
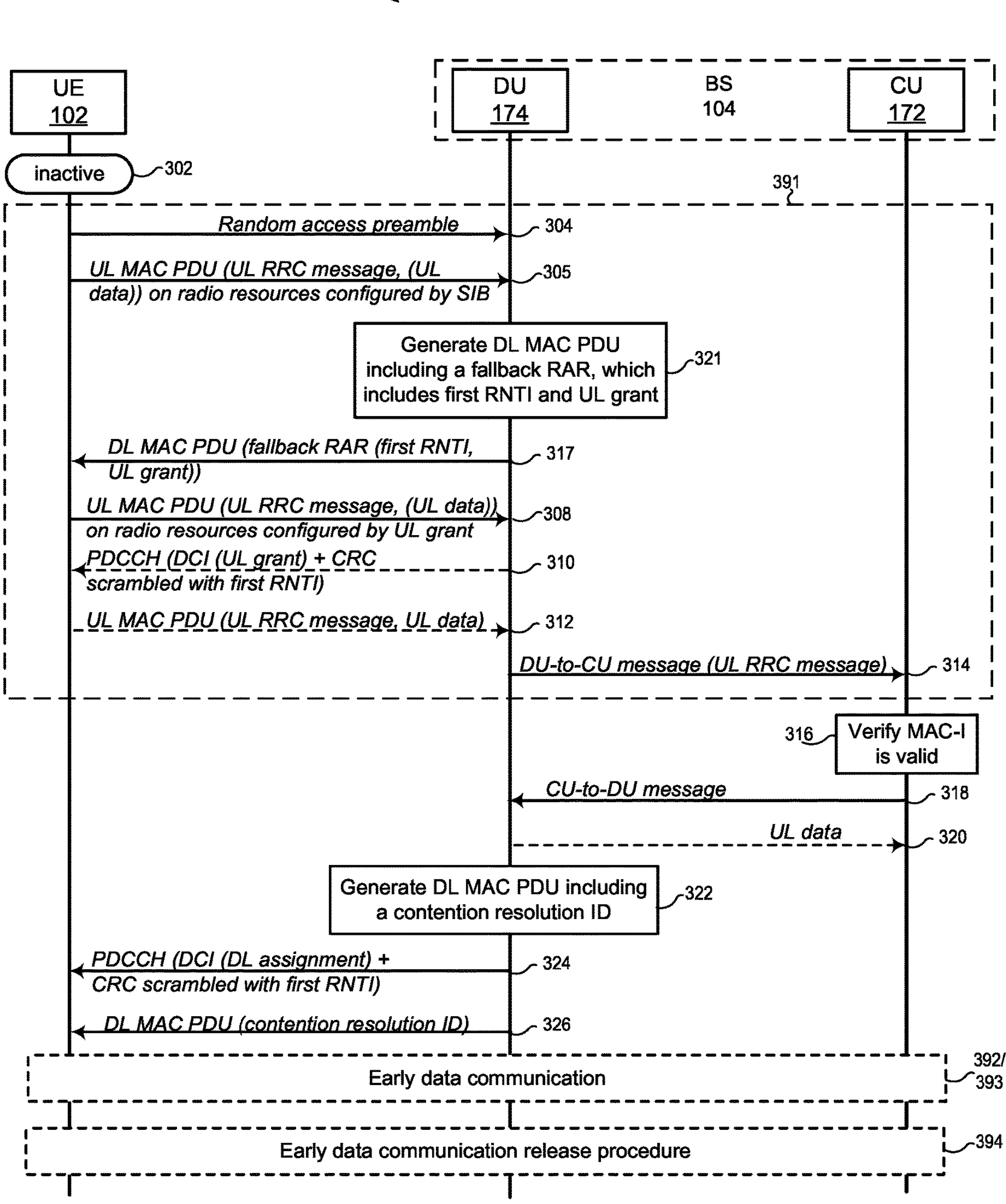
FIG. 3D is an example message sequence similar to the message sequence of FIG. 3B, but where the DU and CU fall back to performing a 4-step random access procedure.
Figure 3E:
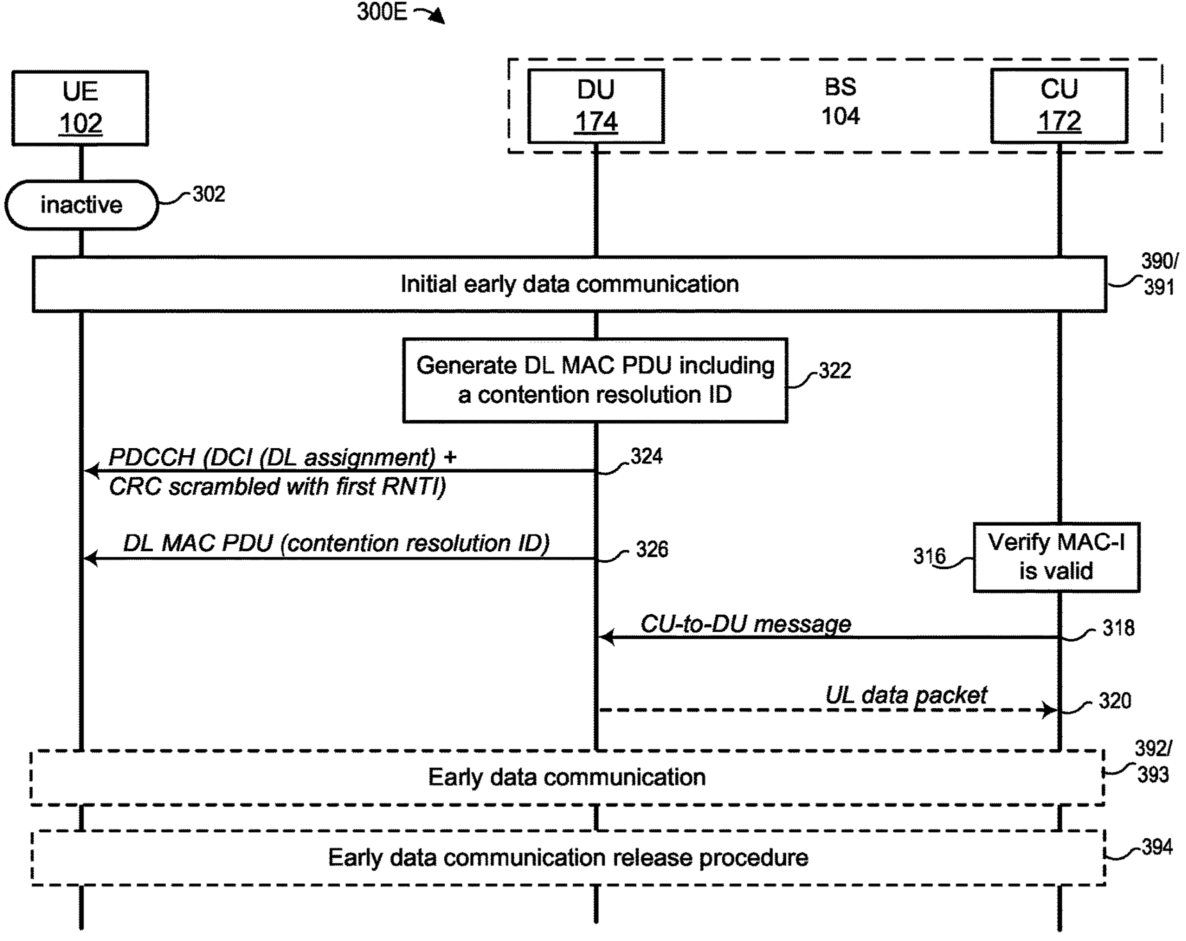
FIG. 3E is an example message sequence similar to the message sequences of FIG. 3A and FIG. 3D, but where the DU performs the random access procedure without any instructions from the CU.

Turning to FIG. 3D, a scenario 300D is initially similar to scenario 300B in events 302, 304, and 305 to initiate a 2-step random access procedure. However, whereas the DU 174 of scenario 300B successfully receives 305 the UL MAC PDU, the DU 174 of scenario 300D fails to receive 305 the UL MAC PDU. Consequently, the DU 174 generates 321 a DL MAC PDU that includes a fallback RAR (e.g., fallbackRAR MAC subheader and a fallbackRAR MAC subPDU), which indicates to the UE 102 to retransmit the UL MAC PDU that the UE 102 transmits at event 305. The fallback RAR includes a UL grant, timing advance command, and the first RNTI. Accordingly, after the DU 174 transmits 317 the DL MAC PDU to the UE 102, the UE 102 in turn retransmits 308 the UL MAC PDU to the DU 174 in accordance with the UL grant. In this way, the UE 102 and the DU 174 revert back to performing a 4-step random access procedure, similar to the 4-step random access procedure (e.g., events 304, 306, 308, and 326) described in scenario 300A of FIG. 3A.

If the DU 174 successfully receives 308 the UL MAC PDU, the scenario 300D can proceed to events 314, 316, 318, 320, 322, 324, 326, 392 or 393, and/or 394 as described above in scenario 300A of FIG. 3A. If the DU 174 fails to receive 308 the UL MAC PDU, the scenario 300D can proceed to events 310, 312, 314, 316, 318, 320, 322, 324, 326, 392 or 393, and/or 394 as described above in scenario 300A of FIG. 3A. The events 304, 305, 321, 317, 308, 310, 312, and 314 are collectively referred to in FIG. 3D as an initial early data communication procedure 391.

In both FIGS. 3A and 3D, the DU 174 delays generating 322 the DL MAC PDU including the contention resolution ID until receiving 318 the CU-to-DU message. However, in other implementations, and with reference to FIG. 3E, the DU 174 can generate 322 the DL MAC PDU including the contention resolution ID in response to receiving 305 the UL MAC PDU during the initial early data communication 390 or 391. Subsequently, the DU 174 proceeds to events 324 and 326 as described above in FIGS. 3A and 3D, thereby transmitting the DL MAC PDU including the contention resolution ID to the UE 102. By the time the DU 174 receives 318 the CU-to-DU message, the UE 102 has already received 326 the contention resolution ID. Thus, in response to receiving 318 the CU-to-DU message, the DU 174 can proceed to performing the early data communication 392 or 393.

Generally, the UE 102 can use a contention resolution timer during a random access procedure. If the UE 102 does not receive a contention resolution ID from the base station 104 after the timer expires, the UE 102 determines that the random access procedure failed. In scenarios described in FIGS. 3A, 3B, and 3D in which the DU 174 delays sending the contention resolution ID in a DL MAC PDU to the UE 102 until receiving the CU-to-DU message from the CU 172, the UE 102 can use a contention resolution timer that accounts for a time period during which CU 172 processes (e.g., verifies) the DU-to-CU message received from the DU 174 to send the CU-to-DU message to the DU 174. However, in scenarios described in FIGS. 3C and 3E in which the DU 174 need not wait for the CU-to-DU message to send the contention resolution ID, the contention resolution timer need not account for the time period described above, and thus can be relatively shorter.

Figure 4A:
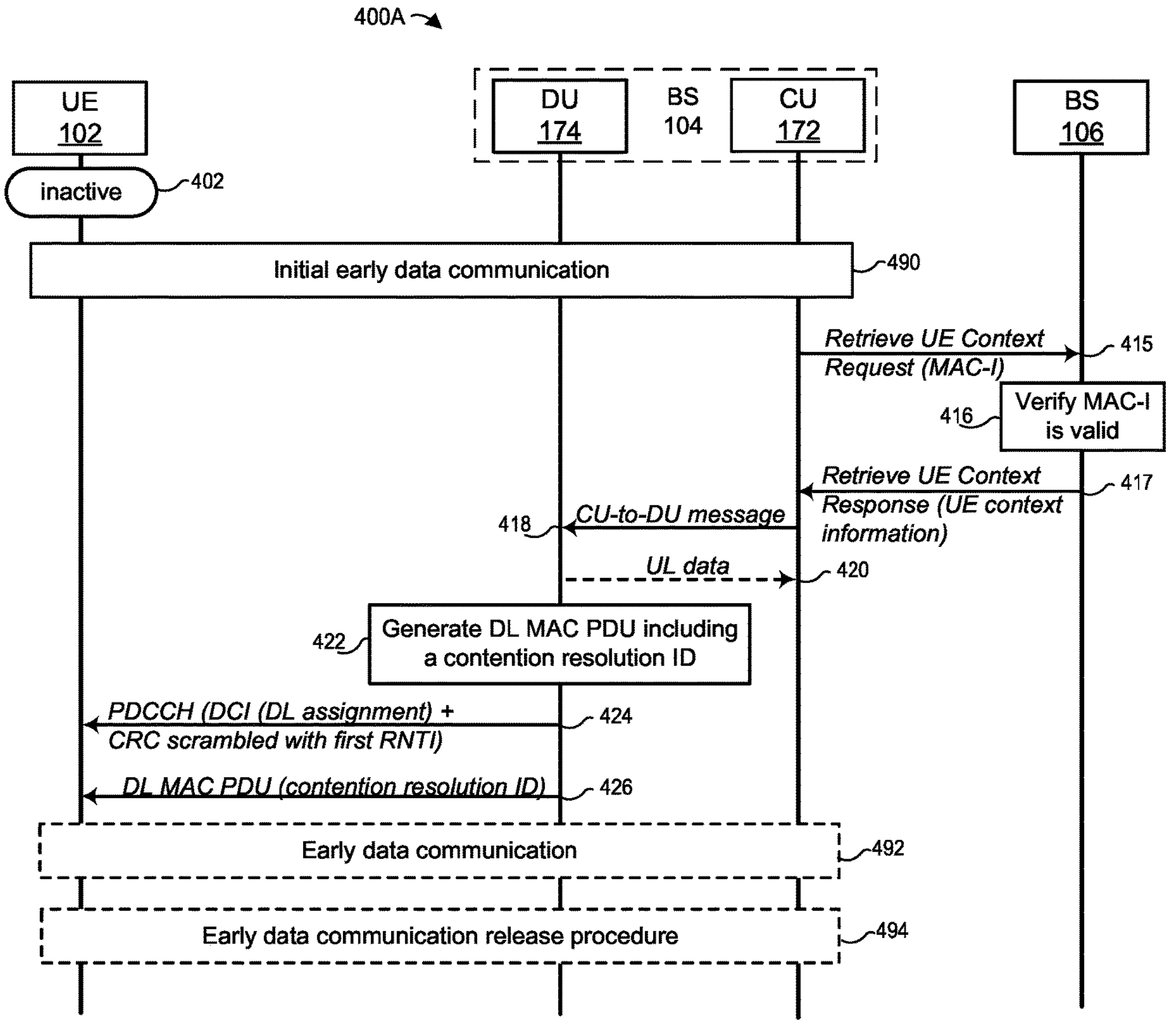
FIG. 4A is an example message sequence similar to the message sequences of FIG. 3A, FIG. 3B, and FIG. 3D, but where the CU coordinates with a second base station to receive UE context information of the UE and complete the random access procedure.

Turning to FIG. 4A, a scenario 400A is similar to scenario 300A or 300B, except a different base station (e.g., base station 106), instead of the base station 104, verifies the MAC-I.

Initially, the UE 102 operates 402 in an inactive state with the base station 104, similar to event 302, and subsequently begins an initial early data communication procedure 490 with the base station 104, similar to initial early data communication procedure 390, 391. During the initial early data communication procedure 490, the DU 174 transmits a DU-to-CU message, including a UL RRC message, to the CU 172.

Whereas in scenario 300A or 300B the CU 172 of base station 104 verifies 316 that the MAC-I included in the UL RRC message is valid, in scenario 400A, the CU 172 retrieves the MAC-I from the UL RRC message and forwards 415 the MAC-I in a Retrieve UE Context Request message to the base station (e.g., base station 106) that provided the last serving cell to the UE 102. If the base station 106 stores UE context information of the UE 102, the base station 106 can verify 416 that the MAC-I is valid by using the UE context information (e.g., security key(s) derived from the UE context information). After the verification, the base station 106 can send 417 the UE context information of the UE 102 in a Retrieve UE Context Response message to the CU 172. In turn, the CU 172 sends 418 a CU-to-DU message to the DU 174, similar to event 318. In implementations in which the DU 174 receives UL MAC PDU that includes UL data during the initial early data communication 490, the CU 172 can receive 420 the UL data from the DU 174.

In response to the DU 174 receiving 418 the CU-to-DU message, the DU 174 can proceed to events 422, 424, 426, 492, and 494, similar to events 322, 324, 326, 392 or 393, and 394, respectively.

Figure 4B:
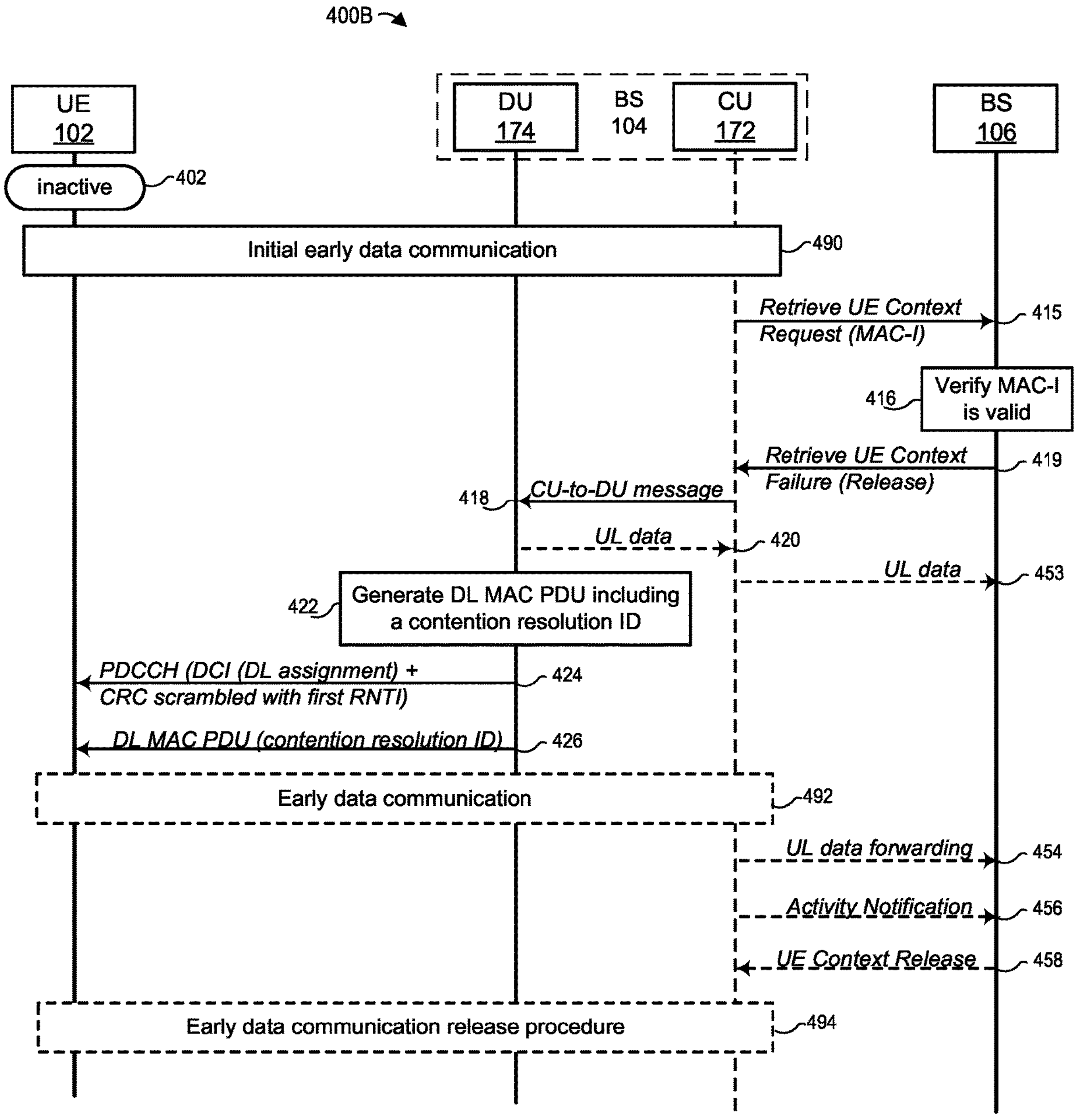
FIG. 4B is an example message sequence similar to the message sequence of FIG. 4A, but where the second base station does not provide the UE context information of the UE to the CU.
Figure 4C:
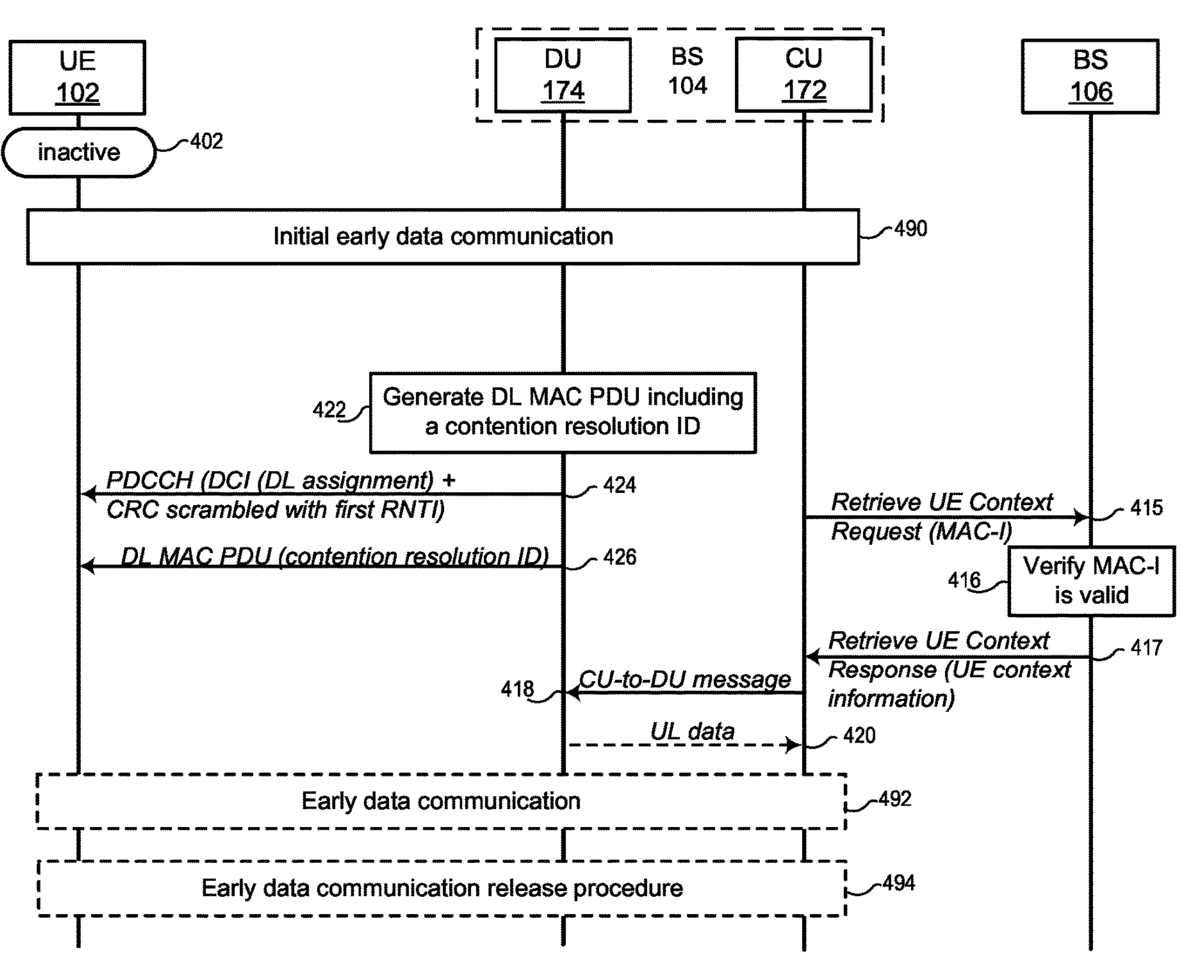
FIG. 4C is an example message sequence similar to the message sequence of FIG. 4A, but where the DU performs the random access procedure without any instructions from the CU.

Turning to FIG. 4B, a scenario 400B is initially similar to scenario 400A in events 402, 490, 415, and 416. However, after verifying 416 that the MAC-I is valid, the base station 106 refrains from sending the UE context information of the UE 102 to the CU 172. Thus, the base station 106 sends 419 an RRC release message in a Retrieve UE Context Failure message to the CU 172. In turn, the CU 172 sends 418 a CU-to-DU message to the DU 174. In implementations in which the DU 174 receives UL MAC PDU that includes UL data during the initial early data communication 490, the CU 172 can receive 420 the UL data from the DU 174. Alternatively, the DU 174 can include the UL data in a DU-to-CU message in the initial early data communication 490, similar to event 314. After receiving the UL data, the CU 172 then sends 453 the UL data to the base station 106. In some implementations, the CU 172 can generate a GTP-U packet that includes the UL data and a first TEID and send 453 the GTP-U packet to the base station 106. After transmitting 419 the Retrieve UE Context Failure message or receiving 453 the UL data, the base station 106 can send to the CU 172 DL data (e.g., DL data packet(s)) that the base station 106 received from the CN 110. In cases that the CU 172 receives the UL data in the DU-to-CU message, the CU 172 in some implementations can include the UL data in the Retrieve UE Context Request message.

In response to the DU 174 receiving 418 the CU-to-DU message, the DU 174 can proceed to events 422, 424, 426, and 492, similar to events 322, 324, 326, and 392 or 393, respectively.

In some implementations, if the CU 172 receives UL data from UE 102 during the early data communication 492, the CU 172 can forward 454 the UL data to the base station 106. In some implementations, if the CU 172 determines that neither the CU 172 nor the UE 102 has transmitted any data in the DL direction or the UL direction for a certain period of data inactivity, the CU 172 can transmit 456 an Activity Notification message indicating UE inactivity to the base station 106. In turn, the base station 106 can send a UE Context Release message to the CU 172. In response to receiving the UE Context Release message, the CU 172 can initiate the early data communication release procedure 494.

In both FIGS. 4A and 4B, the DU 174 delays generating 422 the DL MAC PDU until receiving 418 a CU-to-DU message in response to the CU-to-DU message. However, in other implementations, and with reference to both FIG. 4C and FIG. 4D, the DU 174 can generate 422 the DL MAC PDU in response to receiving the UL MAC PDU during the initial early data communication 490. Subsequently, in both scenarios 400C and 400D, the DU 174 proceeds to events 424 and 426 as described above in FIGS. 4A and 4B, thereby transmitting the DL MAC PDU to the UE 102.

Figure 4D:
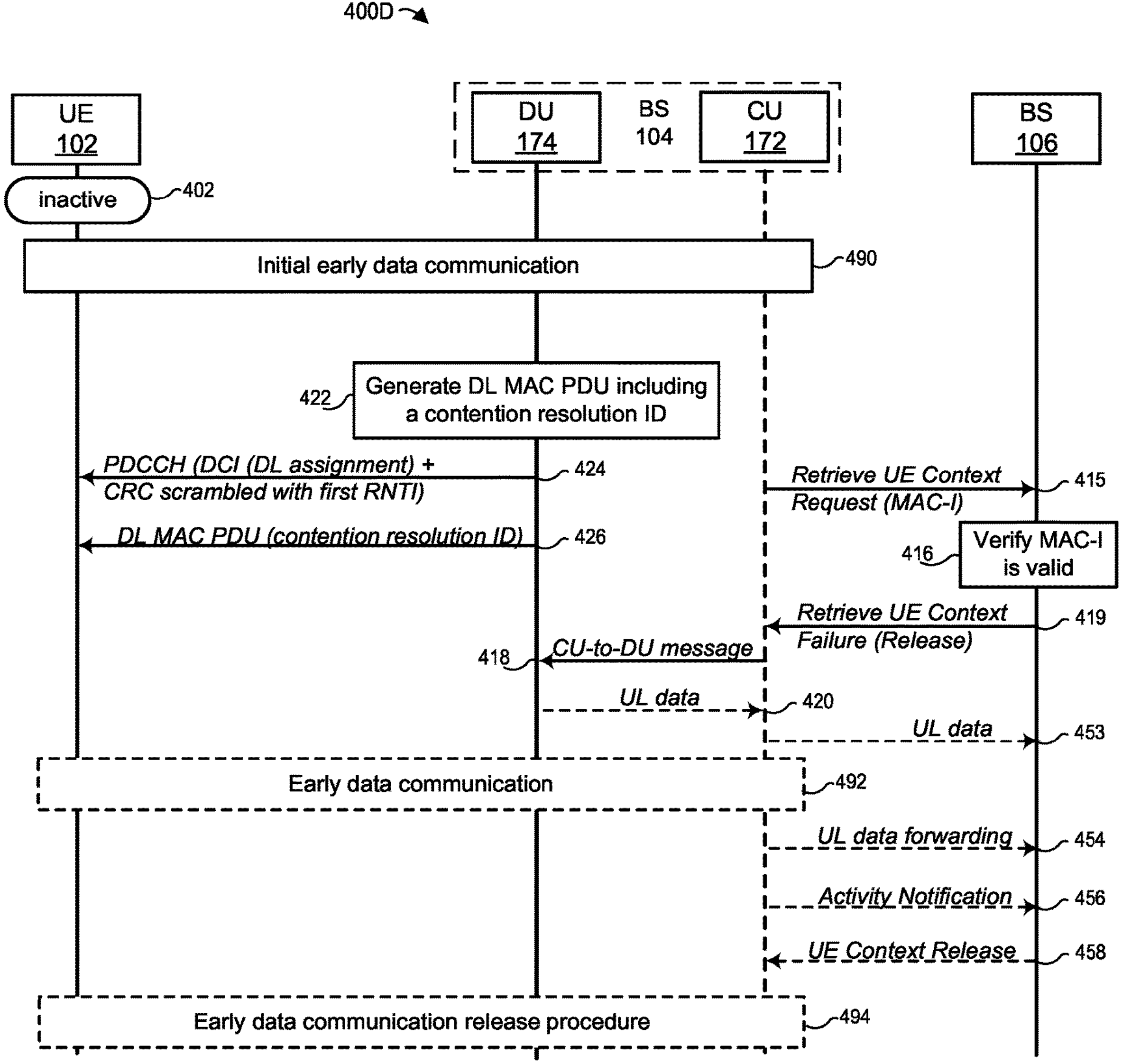
FIG. 4D is an example message sequence similar to the message sequence of FIG. 4B, but where the DU performs the random access procedure without any instructions from the CU.

By the time the DU 174 receives 418 the CU-to-DU message in both scenarios 400C and 400D, the UE 102 has already received 426 the contention resolution ID. Thus, in response to receiving 418 the CU-to-DU message, the DU 174 can proceed to performing the early data communication 492 and/or early data communication release procedure 494. In FIG. 4D, the DU 174 can proceed to events 454, 456, and 458 after the early data communication 492 prior to the early data communication release procedure 494.

Figure 5:
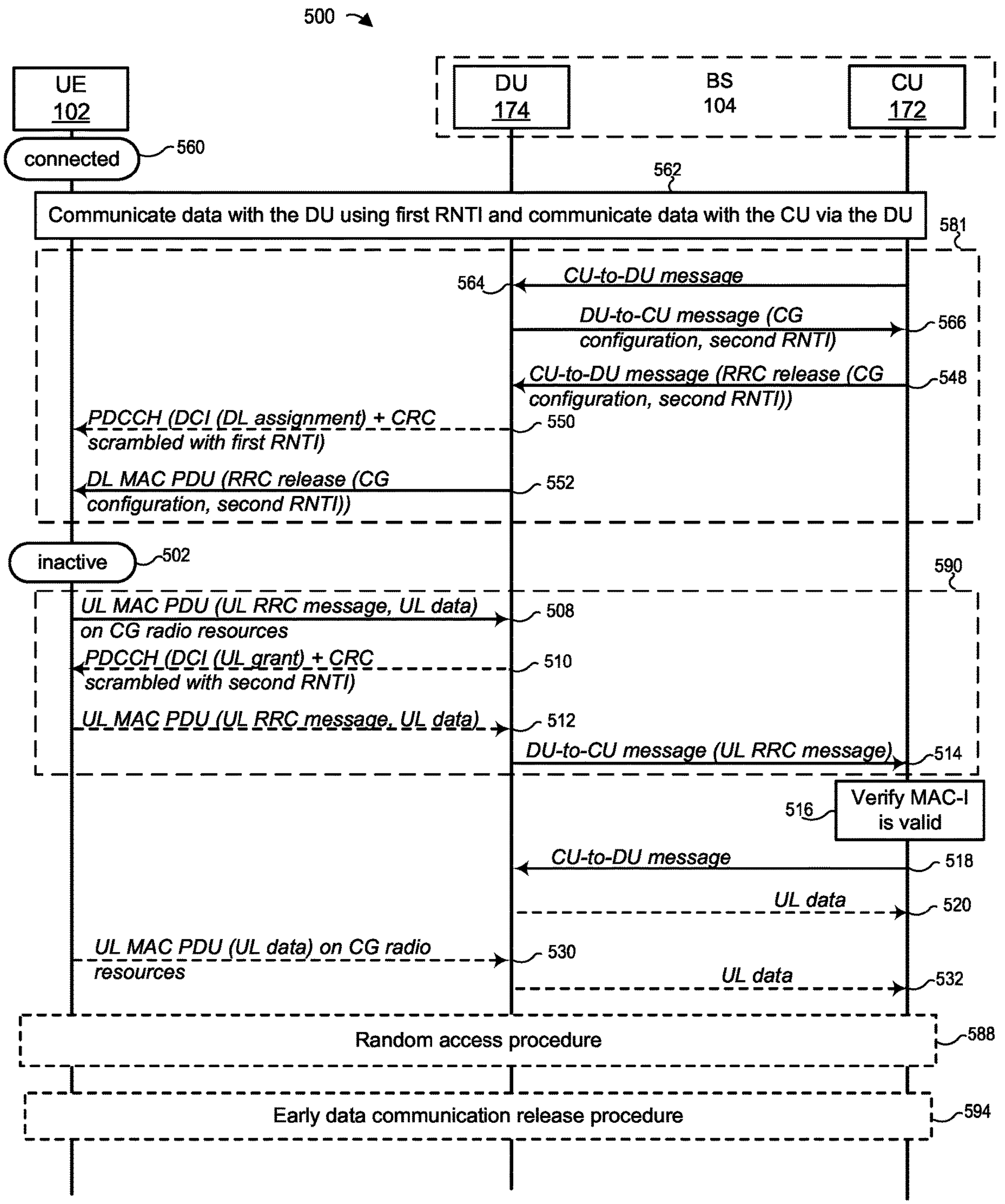
FIG. 5 is an example message sequence in which a DU included in a distributed base station of FIG. 1A or FIG. 1B performs a random access procedure while the UE is already performing early data communication with the RAN.

Referring now to FIG. 5, in a scenario 500, the UE 102 initially operates 560 in a connected state (e.g., RRC_CONNECTED) with the base station 104 including a CU 172 and a DU 174. The UE 102 operating in the connected state communicates 562 data with the DU 174 using a first RNTI and communicates 562 the data with the CU 172 via the DU 174. In some implementations, to configure the UE 102 to send data to the DU 174, the DU 174 can send 562 to the UE 102 first DCIs, each with a CRC scrambled with the first RNTI. The DU 174 includes a particular UL grant in each of the first DCIs. The UE 102 transmits 562 data to the DU 174 in accordance with the UL grants, which the DU 174 can in turn send to the CU 172.

In other implementations, the DU 174 can send 562 to the UE 102 second DCIs, each with a CRC scrambled with the first RNTI. The DU 174 includes a particular DL assignment in each of the second DCIs. The DU 174 transmits 562 data to the UE 102 in accordance with the DL assignments. The DU 174 can generate the data or receive the data from the CU 172.

In some implementations, the UE 102 performs a random access procedure with the DU 174 to obtain the first RNTI, before operating 560 in the connected state or communicating 562 data with the DU 174. The DU 174 includes the first RNTI in a random access response or message B of the random access procedure. The DU 174 also sends a DU-to-CU message including the first RNTI to the CU 172. In other implementations, the UE 102 in the connected state can receive the first RNTI in a handover command message (e.g., RRC reconfiguration message) from another base station (e.g., base station 106) directly or via a CN 110 (e.g., MME 114 or SMF 164). In some implementations, the first RNTI can be a C-RNTI.

After a certain period of data inactivity for the UE 102, the CU 172 can determine that neither the CU 172 nor the UE 102 has transmitted any data in the DL direction or the UL direction, respectively. In some implementations, the CU 172 can make the determination based on a DU-to-CU message received from the DU 174 that indicates data inactivity of the UE 102. In response to the determination, the CU 172 performs 581 a configured resources configuration procedure. In the configured resources configuration procedure 581, the CU 172 sends 564 a CU-to-DU message to the DU 174 to obtain a configured grant (CG) configuration (e.g., encoded as an RRC IE).

The CU-to-DU message that the CU 172 transmits may be a UE Context request message (e.g., a UE Context Setup Request message or a UE Context Modification Request message). In response to receiving 564 the CU-to-DU message, the DU 174 assigns a second RNTI for the UE 102 and sends 566 to the CU 172 a DU-to-CU message including a CG configuration and the second RNTI. The DU-to-CU message may be a UE Context response message (e.g., a UE Context Setup Response message or a UE Context Modification Response message). Alternatively, the CU-to-DU message and the DU-to-CU message at events 564 and 566 respectively can be new messages (e.g. new F1AP messages or new W1AP messages). For example, the new messages can be a CG configuration request message and a CG configuration response message respectively. The CG configuration indicates resources on which the UE 102 can transmit UL transmissions to the DU 174 while operating in an inactive state (i.e., UL resources for performing early data communication). In some implementations, the DU 174 can assign the second RNTI to the same value as the first RNTI. In other implementations, the DU 174 can assign the second RNTI to a value different from the value of the first RNTI. Then, the CU 172 generates an RRC release message (e.g., RRCRelease message or RRCConnectionRelease message) to instruct the UE 102 to transition to the inactive state. The CU 172 includes the CG configuration and the second RNTI in the RRC release message.

In some implementations, the DU 174 includes the CG configuration and the second RNTI in separate fields or IEs of the DU-to-CU message at event 566. In other implementations, the DU 174 includes the second RNTI in the CG configuration and includes the CG configuration in a single field or IE of the DU-to-CU message. In such cases, the second RNTI included in the CG configuration can be transparent to the CU 172. In some scenarios and implementations, the CU 172 needs to know the second RNTI. Thus, the CU 172 can decode the CG configuration to obtain the second RNTI. In other implementations, the DU 174 can include an additional instance of the second RNTI as an IE (e.g., F1AP IE or W1AP IE) of the DU-to-CU message in addition to including the second RNTI in the CG configuration. Thus, the CU 172 can directly obtain the second RNTI from the IE of the DU-to-CU message without decoding the CG configuration.

In some implementations, the second RNTI can be a preconfigured uplink resources RNTI (PUR-RNTI). In other implementations, the second RNTI can be a configured scheduling RNTI (CS-RNTI) for the inactive state. The CU 172 can assign an I-RNTI or a resume ID to the UE 102 and include the assigned value in the RRC release message. Subsequently, the CU 172 sends 548 a CU-to-DU message including the RRC release message to the DU 174, which in turn sends 552 the RRC release message to the UE 102 in a DL MAC PDU. Prior to sending 552 the DL MAC PDU to the UE 102, the DU 174 may transmit 550 a DCI and a CRC scrambled using the first RNTI to the UE 102. The DCI may include a DL assignment indicating a resource on which the UE 102 can receive 552 the DL MAC PDU. The DL assignment can include at least a modulation and coding format, resource allocation, and/or HARQ information related to a HARQ transmission including the DL MAC PDU.

The UE 102 transitions to the inactive state upon receiving the RRC release message and operates 502 in the inactive state. At a later time, the UE 102 in the inactive state initiates early data communication (e.g., EDT) to transmit UL data or receive DL data, similar to scenario 300A. However, whereas the UE 102 of scenario 300A uses the UL grant received in event 306 during a random access procedure to perform the initial early data communication procedure 390, the UE 102 of scenario 500 uses the CG configuration (i.e., CG radio resources) received in event 552 to perform the initial early data communication procedure 590.

In the initial early data communication procedure 590, the UE 102 generates and transmits 508 an initial UL MAC PDU including a UL RRC message on CG radio resources to the DU 174, similar to event 308.

If the DU 174 fails to properly receive 508 the initial UL MAC PDU, the DU 174 can send 510 a DCI and a scrambled CRC on a PDCCH to indicate to the UE 102 to retransmit the initial UL MAC PDU. Whereas the DU 174 of scenario 300A scrambles the CRC with the first RNTI that was sent 306 to the UE 102 during the random access procedure, the DU 174 of scenario 500 scrambles the CRC with the second RNTI that was sent 552 to the UE 102. More specifically, the DU 174 generates the DCI including a UL grant, generates a CRC from the DCI, and scrambles the CRC with the second RNTI. The UE 102 transmits 512 (a HARQ retransmission of) the initial UL MAC PDU, and if necessary continues to retransmit the initial UL MAC PDU, similar to event 312, until the DU 174 successfully receives the initial MAC PDU.

In some implementations, the UE 102 can transmit 530 a subsequent UL MAC PDU including subsequent UL data on CG radio resources to the DU 174, similar to event 330. The DU 174 can send 532 the subsequent UL data to the CU 174.

In some alternative implementations, the DU 174 does not send the UE 102 a DCI to instruct the UE 102 to retransmit a UL MAC PDU (e.g., the initial UL MAC PDU or the UL MAC PDU at event 508 or 530, respectively). In cases that the UE 102 does not receive a DCI to instruct the UE 102 to retransmit a UL MAC PDU (e.g., the initial UL MAC PDU or the UL MAC PDU at event 508 or 530, respectively), the UE 102 can retransmit the UL MAC PDU on CG radio resources configured by the CG configuration.

After the DU 174 receives the initial UL MAC PDU, scenario 500 proceeds to events 514, 516, 518, 520, 530, 532, 588, and 594, similar to events 314, 316, 318, 320, 330, 332, 388, and 394.

In some implementations, the UE 102 can initiate the random access procedure 588 because the UE 102 has UL data to transmit, similar to event 388. In some of these implementations, the UE 102 may not have CG resources to transmit the UL data. Thus, the UE 102 can initiate an SR to request the DU 174 to provide a UL grant to the UE, and in response to the SR, the UE 102 can initiate the random access procedure 588. In yet other implementations, the UE 102 can initiate the random access procedure 588 when the UE 102 determines that the signal strength or quality of DL reference signal(s) received from the base station 104 meets certain thresholds. For example, the UE 102 may initiate the random access procedure 588 when the signal strength or quality is below a first threshold, or refrain from initiating the random access procedure 588 if the signal strength or quality is above or equal to a second threshold. The first and second thresholds can be identical or different values. In some cases, the CU 172 can obtain the first and/or second thresholds from the DU 174 and transmit a DL RRC message (e.g., an RRC release message, RRC reconfiguration message) including the first and/or second thresholds to the UE 102, while the UE operates 502 in either the inactive state or operates 560 in the connected state.

FIGS. 6A-13 are flow diagrams depicting example methods that a network node of a RAN (e.g., a network node of the RAN 105, such as the DU 174 and/or the CU 172 of a base station 104, or the base station 106) or a UE (e.g., the UE 102) can implement to manage early data communication.

Figure 6A:
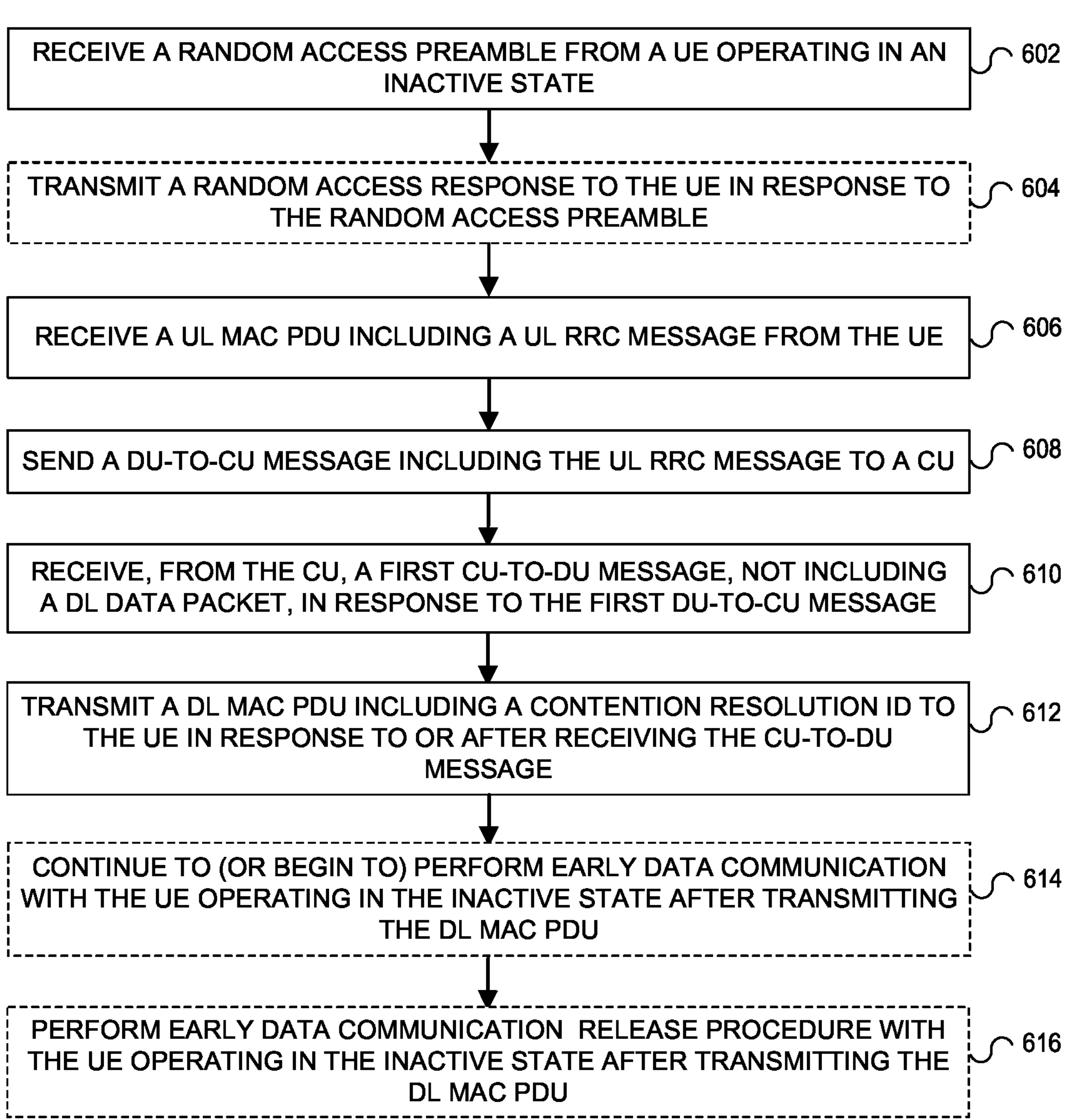
FIG. 6A is a flow diagram of an example method in which a DU and CU included in a distributed base station of FIG. 1A or FIG. 1B perform a random access procedure for early data communication with the UE.

Turning first to FIG. 6A, a DU (e.g., the DU 174) can implement an example method 600A to communicate with a UE (e.g., the UE 102) while the UE operates in an inactive state (e.g., in scenarios 300A, 300B, 300D, 400A, and 400B).

At block 602, the DU receives a random access preamble from the UE while the UE is operating in an inactive state (e.g., in events 304, 490) for initiating a random access procedure. In some implementations, the DU may perform a 4-step random access procedure with the UE and thus transmit, at block 604, a random access response to the UE in response to the random access preamble (e.g., as in event 306 of FIG. 3A). The random access preamble can include a temporary identifier of the UE (e.g., the first RNTI described in event 306). In other implementations, the DU may perform a 2-step random access procedure with the UE and thus omit transmitting the random access response (e.g., as in FIGS. 3B, 3D). In the 2-step random access procedure, the DU can provide the temporary identifier of the UE (e.g., the first RNTI described in event 307 of FIG. 3B) to the UE in the DL MAC PDU described below in block 612.

At block 606, the DU receives a UL MAC PDU including a UL RRC message from the UE (e.g., in events 308, 312, 305). In some cases, the UL MAC PDU can include UL data packet(s), or at least a portion of UL data packet(s). In turn, the DU at block 608 sends, to a CU (e.g., the CU 172) a DU-to-CU message including the UL RRC message (e.g., in events 314, 490).

In some implementations, in response to sending the DU-to-CU message to the CU at block 608, the DU at block 610 receives, from the CU, a first CU-to-DU message that does not include any DL data packets (e.g., in events 318, 418). In some of these implementations, the DU receives the first CU-to-DU message after the CU verifies that the MAC-I included in the UL RRC message is valid. The CU may be a part of the same base station (e.g., base station 104) as the DU (e.g., as in FIG. 3A, 3B, 3D) or part of a different base station (e.g., base station 106), such as in the scenarios illustrated in FIGS. 4A, 4B.

In response to or after receiving the first CU-to-DU message, the DU at block 612 transmits a DL MAC PDU including a contention resolution ID to the UE (e.g., in events 326, 307, 426). That is, the DU refrains from transmitting the DL MAC PDU to the UE before receiving the first CU-to-DU message, and delays transmitting the DL MAC PDU until receiving the first CU-to-DU message (e.g., as in FIGS. 3A, 3B, 3D, 4A, 4B). The DU may generate the contention resolution ID from the UL MAC PDU received at block 606. For example, the DU can generate the contention resolution ID by including a certain number of bits (e.g., the first 48 bits) of the UL MAC PDU or the UL RRC message included in the UL MAC PDU. Because the first CU-to-DU message at block 610 does not include any DL data packets, the DU 174 does not include a DL data packet in the DL MAC PDU. To prevent the UE from transitioning from the inactive state to a connected state (thereby maintaining early data communication capabilities), the DU does not include an DL RRC message (e.g., RRCSetup message, RRCConnectionSetup message, RRCResume message, or RRCConnectionResume message) causing the UE to transition to the connected state in the DL MAC PDU that may trigger the UE to transition to the connected state.

After transmitting the DL MAC PDU to the UE, the DU at block 614 can perform (or begin performing) early data communication with the UE that is still operating in the inactive state (e.g., in events 392, 393, 492). In implementations in which the UL MAC PDU can include UL data packet(s) described above in block 606, the DU at block 614 continues performing early data communication that was initially started at block 606. In implementations in which the UL MAC PDU does not include UL data packet(s), the DU at block 614 begins performing early data communication. In some implementations, during the early data communication, the DU can perform another random access procedure with the UE still operating in the inactive state (e.g., in events 388, 389), e.g., when the UE has additional UL data to send to the DU for EDT. In some implementations, after a certain period of data inactivity for the UE, the DU at block 616 can perform an early data communication release procedure with the UE (e.g., in events 394, 494).

In other implementations of method 600A, in response to sending the DU-to-CU message to the CU at block 608, the DU may receive, from the CU, a second CU-to-DU message instead of the first CU-to-DU message, e.g., when the CU determines that the MAC-I included in the UL RRC message at block 608 is invalid. In these implementations, the DU refrains from performing early data communication at block 614. In some cases, if the second CU-to-DU message includes an RRC release message, the DU sends the RRC release message to the UE to perform the early data communication release procedure at block 616.

Figure 6B:
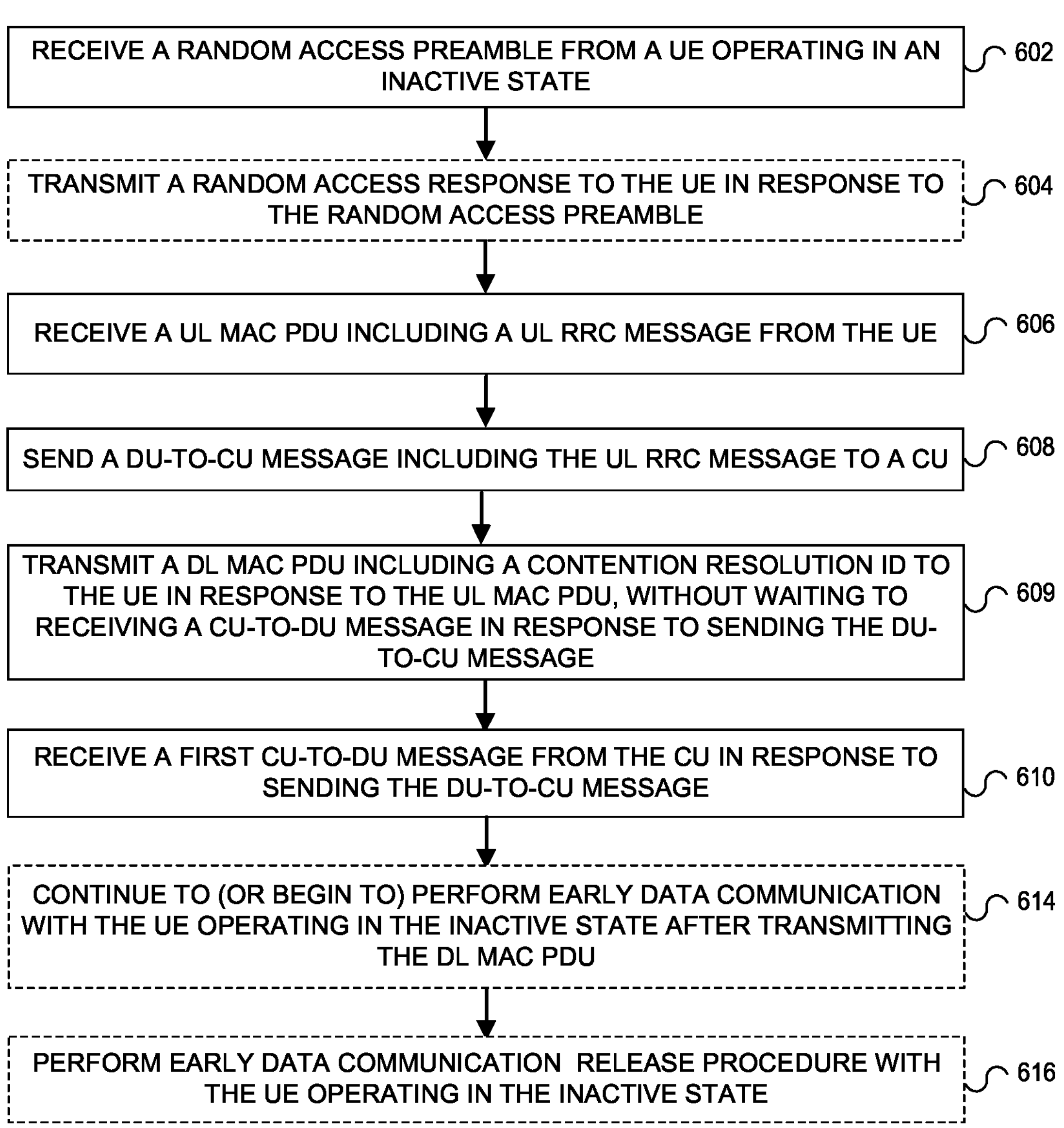
FIG. 6B is a flow diagram of an example method similar to the method of FIG. 6A, but where the DU performs the random access procedure without any instructions from the CU.

Turning to FIG. 6B, a DU (e.g., the DU 174) can implement an example method 600B to communicate with a UE (e.g., the UE 102) while the UE operates in an inactive state. The method 600B is initially similar to the method 600A at blocks 602, 604, 606, and 608. However, after block 608, the DU of method 600B does not wait until receiving 610 the first CU-to-DU message to transmit the DL MAC PDU, as does the DU of method 600A. Instead, the DU at block 609 transmits the DL MAC PDU in response to receiving the UL MAC PDU from the UE at block 606 (e.g., as in event 307 of FIG. 3C, event 326 of FIG. 3E, event 426 of FIGS. 4C, 4D). Subsequently, the DU at block 610 receives the first CU-to-DU message from the CU in response to sending the DU-to-CU message at block 608. The DU then proceeds to blocks 614 and 616 as described in method 600A.

Figure 6C:
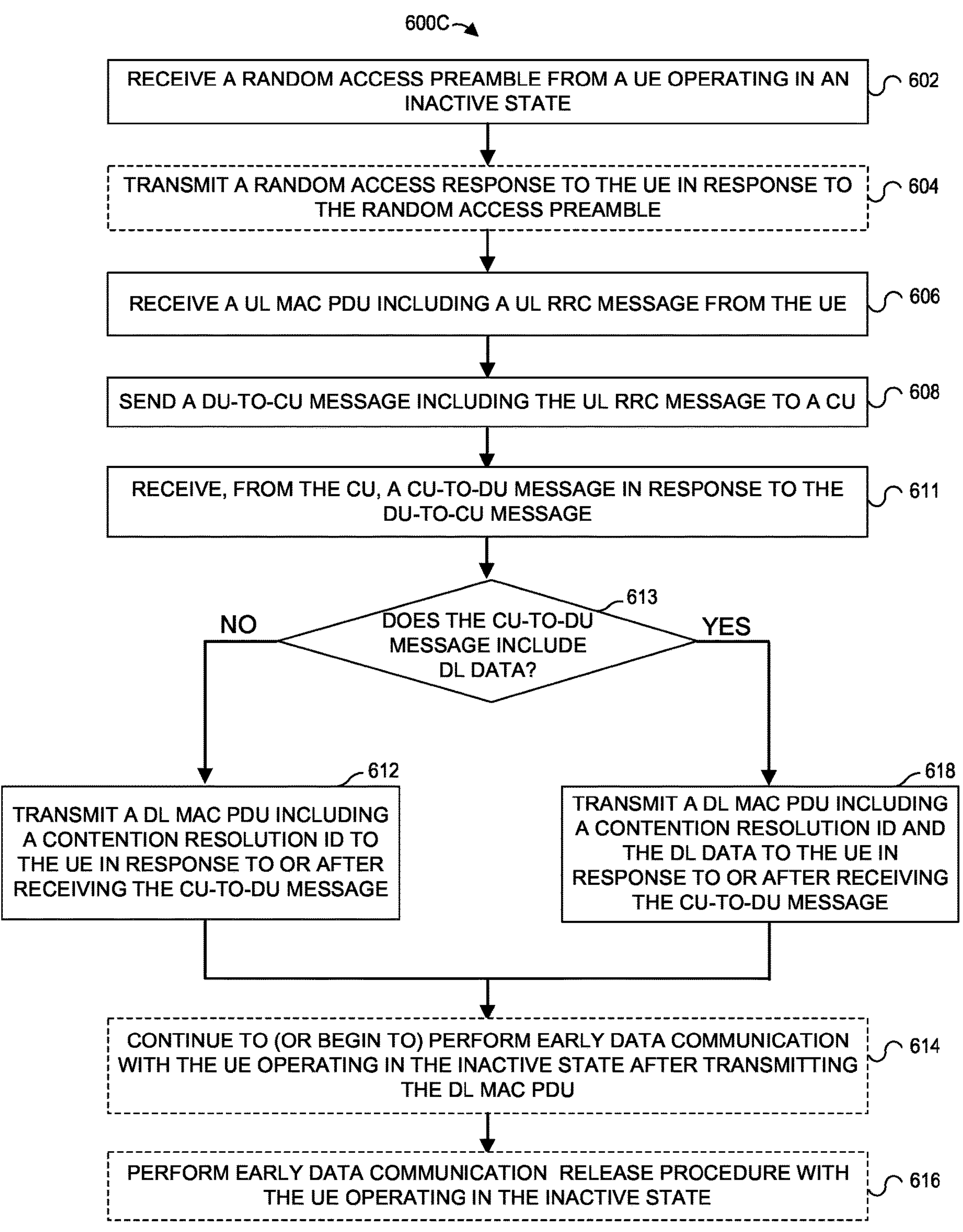
FIG. 6C is a flow diagram of an example method similar to the method of FIG. 6A, but where the DU sends DL data received from the CU and a contention resolution ID in a single DL MAC PDU to the UE to complete the random access procedure.

Turning to FIG. 6C, a DU (e.g., the DU 174) can implement an example method 600C to communicate with a UE (e.g., the UE 102) while the UE operates in an inactive state. The method 600C is initially similar to the method 600A at blocks 602, 604, 606, and 608. However, after block 608, whereas the DU of method 600A at block 610 receives the first CU-to-DU message that does not include any DL data packets from the CU, the DU of method 600C at block 611 receives the first CU-to-DU message that in some scenarios includes DL data packet(s). If the DU at 613 determines that the first CU-to-DU message does not include DL data, the DU proceeds to block 612, similar to scenario 600A. However, if the DU at 613 determines that the first CU-to-DU message includes DL data, the DU at block 618 transmits a DL MAC PDU including a contention resolution ID and the DL data to the UE. After either of blocks 612 or 618, the DU proceeds to blocks 614 and/or 616, as described above.

Figure 6D:
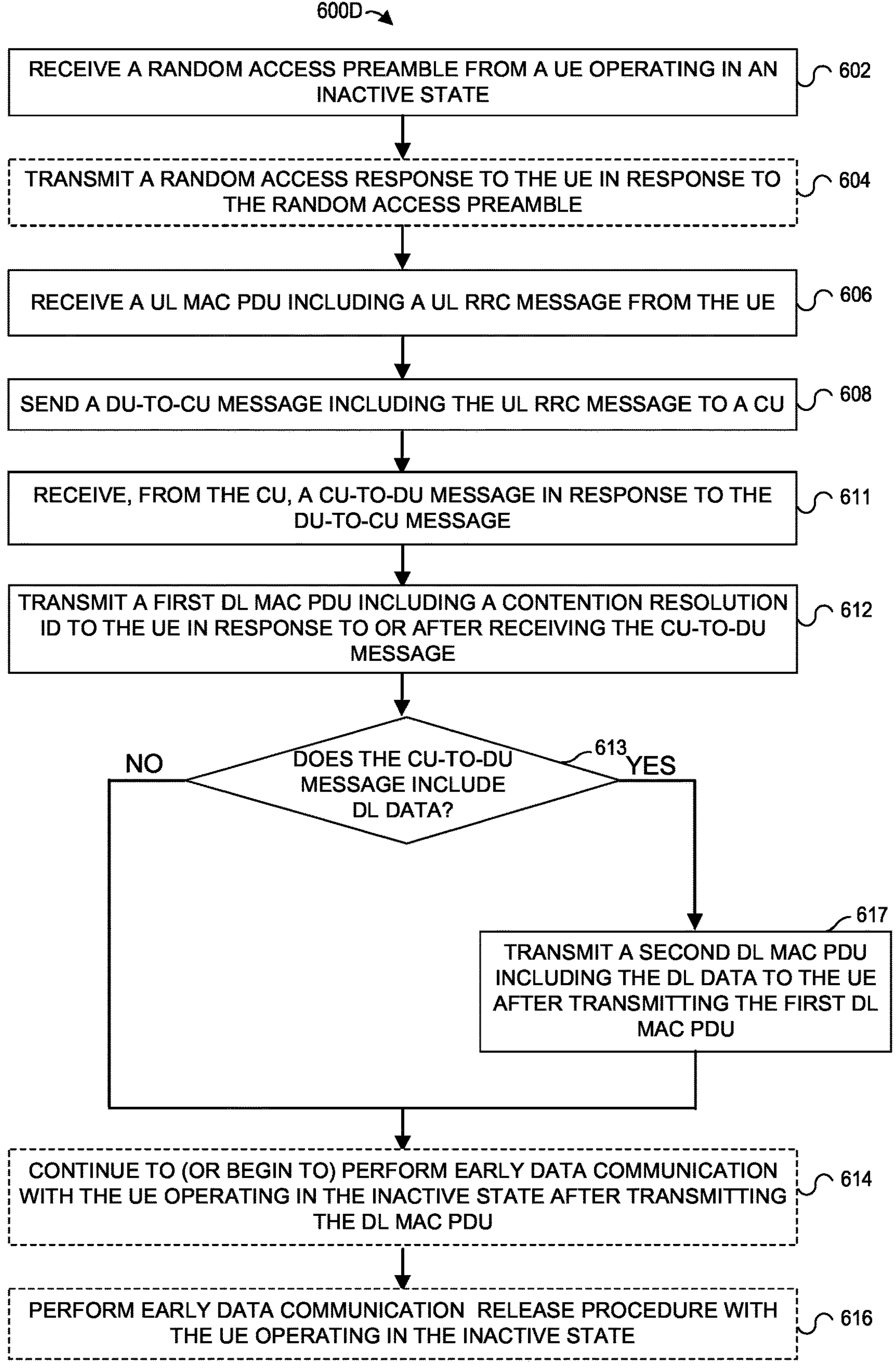
FIG. 6D is a flow diagram of an example method similar to the method of FIG. 6C, but where the DU sends the DL data and the contention resolution ID in separate respective DL MAC PDUS.

Turning to FIG. 6D, a DU (e.g., the DU 174) can implement an example method 600D to communicate with a UE (e.g., the UE 102) while the UE operates in an inactive state. The method 600D is initially similar to the method 600C at blocks 602, 604, 606, 608, and 611. However, after block 611, whereas the DU of method 600C at block 613 checks whether the CU-to-DU message received at block 611 includes any DL data prior to transmitting a single DL MAC PDU that contains the contention resolution ID and any DL data, the DU of method 600D at block 612 transmits a first DL MAC PDU including a contention resolution ID to the UE without checking whether the CU-to-DU message includes any DL data. After transmitting the first DL MAC PDU, if the DU at block 613 determines that the CU-to-DU message includes DL data, the DU at block 617 transmits a second DL MAC PDU including the DL data. As such, the DU of method 600C can transmit a single DL MAC PDU that contains the contention resolution ID and any DL data, whereas the DU of method 600D transmits the contention resolution ID and any DL data in separate respective DL MAC PDUs. After either of blocks 612 or 617, the DU proceeds to blocks 614 and/or 616, as described above.

Figures 7, 8:
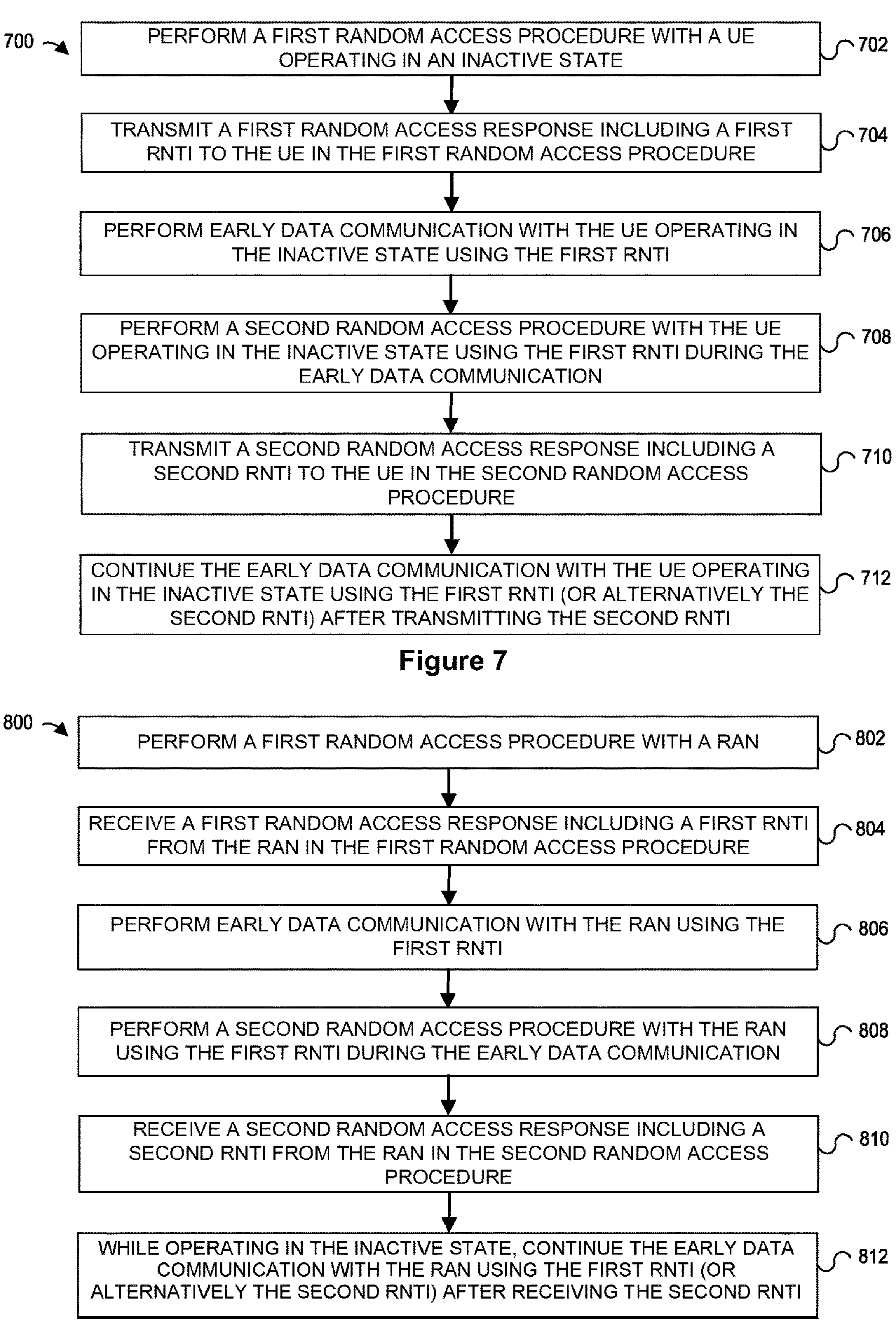
FIG. 7 is a flow diagram of an example method in which a RAN of FIG. 1A or FIG. 1B performs a first random access procedure to initiate an early data communication procedure with a UE and a second random access procedure while the RAN is already performing early data communication with the UE.
FIG. 8 is a flow diagram of an example method in which a UE of FIG. 1A performs a first random access procedure to initiate an early data communication procedure with the RAN and a second random access procedure while the UE is already performing early data communication with the RAN.

Turning next to FIG. 7, a RAN (e.g., the RAN 105) can implement an example method 700 to communicate with a UE (e.g., the UE 102) while the UE operates in an inactive state.

Initially, the RAN at block 702 performs a first random access procedure with the UE operating in an inactive state, which includes transmitting a first random access response to the UE at block 704, similar to blocks 602 and 604, respectively. The first random access response includes a first RNTI.

At block 706, after performing the first random access procedure, the RAN performs early data communication with the UE still operating in the inactive state, similar to block 614.

At block 708, the RAN performs a second random access procedure with the UE still operating in the inactive state using the first RNTI (e.g., in event 388), which includes transmitting a second random access response to the UE at block 710 (e.g., in event 336), e.g., when the UE has additional UL data to send to the RAN. The second random access response includes a second RNTI.

At block 712, the RAN continues performing early data communication with the UE still operating in the inactive state after transmitting the second RNTI to the UE, similar to block 614. In some implementations, the RAN utilizes the first RNTI to continue performing early data communication with the UE. In other implementations, the RAN utilizes the second RNTI instead of the first RNTI.

Turning next to FIG. 8, a UE (e.g., the UE 102) can implement an example method 800 to communicate with a RAN (e.g., the RAN 105) while the UE operates in an inactive state. Method 800 is similar to method 700, except from the UE perspective.

Initially, the UE at block 802 operating in an inactive state performs a first random access procedure with the RAN, which includes receiving a first random access response from the RAN at block 804, similar to blocks 702 and 704 respectively. The first random access response includes a first RNTI.

At block 806, after performing the first random access procedure, the UE still operating in the inactive state performs early data communication with the RAN, similar to block 706.

At block 808, the UE still operating in the inactive state performs a second random access procedure with the RAN using the first RNTI, which includes receiving a second random access response from the RAN at block 810, similar to blocks 708 and 710, respectively. The second random access response includes a second RNTI.

At block 812, the UE still operating in the inactive state continues performing early data communication with the RAN after receiving the second RNTI from the RAN, similar to block 712. In some implementations, the UE utilizes the first RNTI to continue performing early data communication with the RAN. In other implementations, the UE utilizes the second RNTI instead of the first RNTI.

Figures 9, 10:
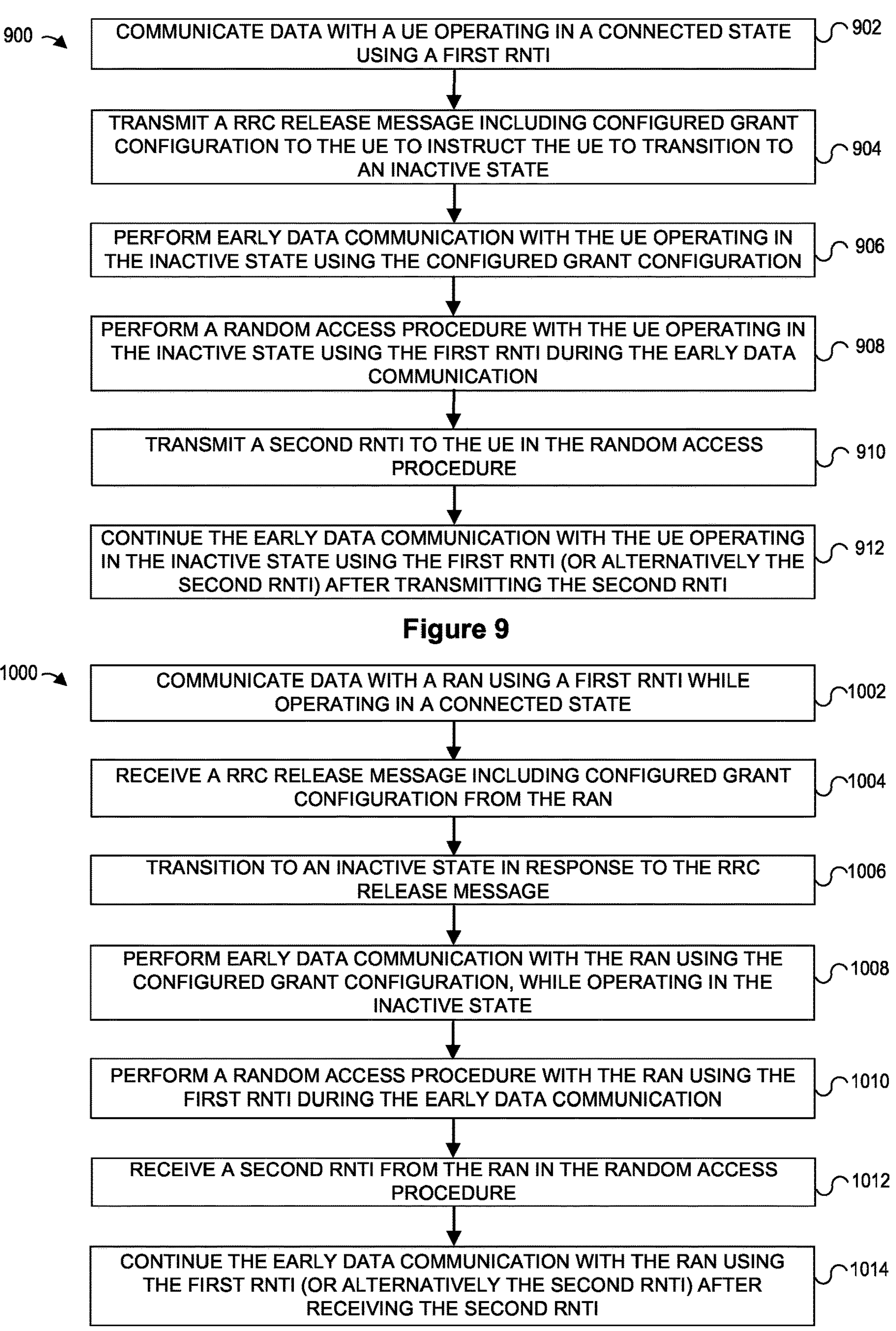
FIG. 9 is a flow diagram of an example method in which a RAN of FIG. 1A or FIG. 1B performs a random access procedure while the RAN is already performing early data communication with a UE.
FIG. 10 is a flow diagram of an example method in which a UE of FIG. 1A performs a random access procedure while the UE is already performing early data communication with a RAN.

Turning next to FIG. 9, a RAN (e.g., the RAN 105) can implement an example method 900 to communicate with a UE (e.g., the UE 102) while the UE operates in an inactive state (e.g., in scenario 500).

Initially, the RAN at block 902 communicates data with the UE operating in a connected state using a first RNTI (e.g., in event 562).

At block 904, the RAN transmits an RRC release message including a configured grant configuration to the UE to instruct the UE to transition to an inactive state (e.g., in event 581).

At block 906, the RAN performs early data communication with the UE operating in the inactive state using the configured grant configuration (e.g., in events 530, 532). That is, instead of the UE and the RAN performing a random access procedure for initiating EDT, as described in FIGS. 6A-8, the RAN provides the configured grant configuration to the UE for initiating EDT.

At block 908, during the early data communication, the RAN performs a random access procedure with the UE still operating in the inactive state using the first RNTI (e.g., in events 588), which includes transmitting a second RNTI to the UE at block 910. The UE may initiate the random access procedure when the UE has additional UL data to send to the RAN after already having been configured with the grant configuration for initiating EDT.

At block 912, the RAN continues the early data communication with the UE after transmitting the second RNTI. In some implementations, the RAN utilizes the first RNTI to continue performing early data communication with the UE. In other implementations, the RAN utilizes the second RNTI instead of the first RNTI.

Turning next to FIG. 10, a UE (e.g., the UE 102) can implement an example method 1000 to communicate with a RAN (e.g., the RAN 105) while the UE operates in an inactive state. Method 1000 is similar to method 900, except from the UE perspective.

Initially, the UE at block 1002 operating in a connected state communicates data with the RAN using a first RNTI, similar to block 902.

At block 1004, the UE receives an RRC release message including a configured grant configuration from the RAN to instruct the UE to transition to an inactive state, similar to block 904. Consequently, at block 1006, the UE transitions to the inactive state in response to receiving the RRC release message.

At block 1008, the UE operating in the inactive state performs early data communication with the RAN using the configured grant configuration, similar to block 906.

At block 1010, the UE still operating in the inactive state performs a random access procedure with the RAN using the first RNTI during the early data communication, similar to block 908, which includes receiving a second RNTI to the UE at block 1012, similar to block 910.

At block 1014, the UE continues the early data communication with the RAN after receiving the second RNTI, similar to block 912.

Figure 11:
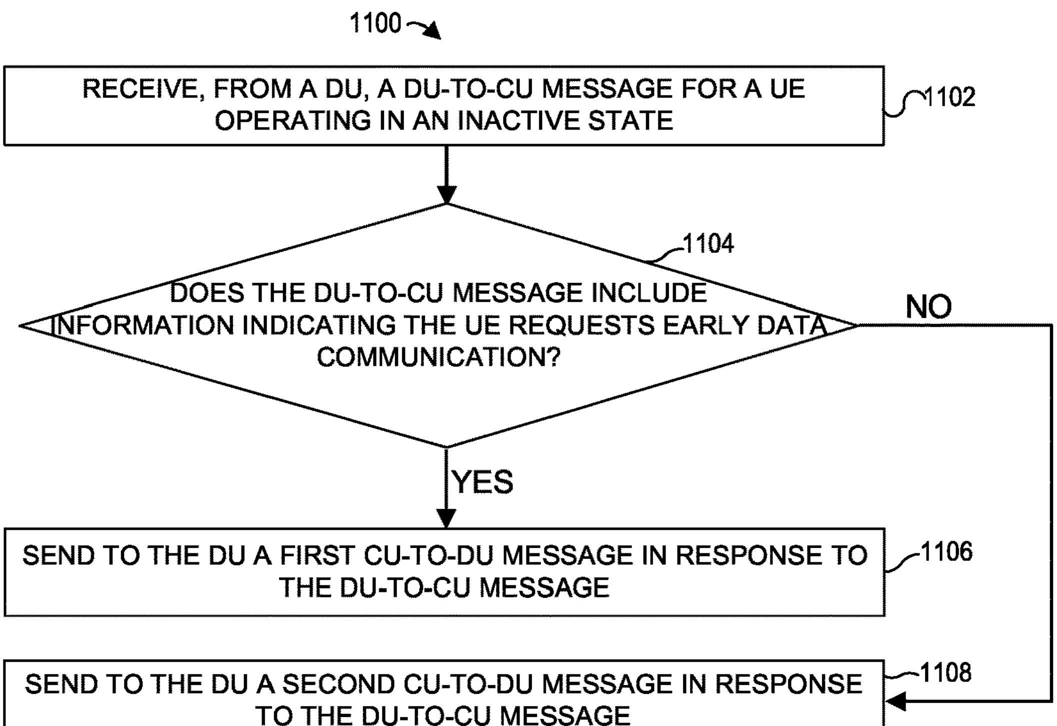
FIG. 11 is a flow diagram of an example method in which a CU of FIG. 1A or FIG. 1B, in response to receiving from a DU a DU-to-CU message indicating that a UE requests early data communication, sends a CU-to-DU message to the DU, for the DU to complete a random access procedure with the UE.

Turning next to FIG. 11, a CU (e.g., the CU 172) can implement an example method 1100 to communicate with a DU (e.g., the DU 174) for configuring early data communication with a UE (e.g., the UE 102) while the UE operates in an inactive state.

Initially, the CU at block 1102 receives, from the DU, a DU-to-CU message for the UE operating in an inactive state (e.g., in events 314, 490, 514).

At block 1104, the CU determines whether the DU-to-CU message includes information indicating that the UE requests early data communication. If the CU determines that the DU-to-CU message indicates that the UE requests early data communication, the CU at block 1106 sends, to the DU, a first CU-to-DU message in response to the DU-to-CU message (e.g., in events 318, 418, 518). In some implementations, the first CU-to-DU message can be an existing F1AP message or a W1AP (e.g., DI. RRC Message Transfer message, UE Context Setup Request message, or UE Context Modification Request message). In other implementations, the first CU-to-DU message can be a new F1AP message or a new W1AP message specific for early data communication. Upon receiving the first CU-to-DU message, the DU can generate and transmit a DL MAC PDU including a contention resolution ID to the UE for the UE to perform early data communication with the DU.

If the CU determines that the DU-to-CU message does not indicate that the UE requests early data communication, the CU at block 1108 sends, to the DU, a second CU-to-DU message in response to the DU-to-CU message. In some implementations, the second DU-to-CU message can be a DL RRC Message Transfer message. In some implementations, the second CU-to-DU message can include a DL RRC message, such as an RRC setup message (e.g., RRCSetup message or RRCConnectionSetup message), an RRC Reject message (e.g., RRCReject or RRCConnectionReject message) or an RRC Resume message (e.g., RRCResume or RRCConnectionResume message). Upon receiving the second CU-to-DU message, the DU can generate and transmit a DL MAC PDU including the DL RRC message to the UE, which prevents the UE from performing early data communication with the DU.

Figure 12:
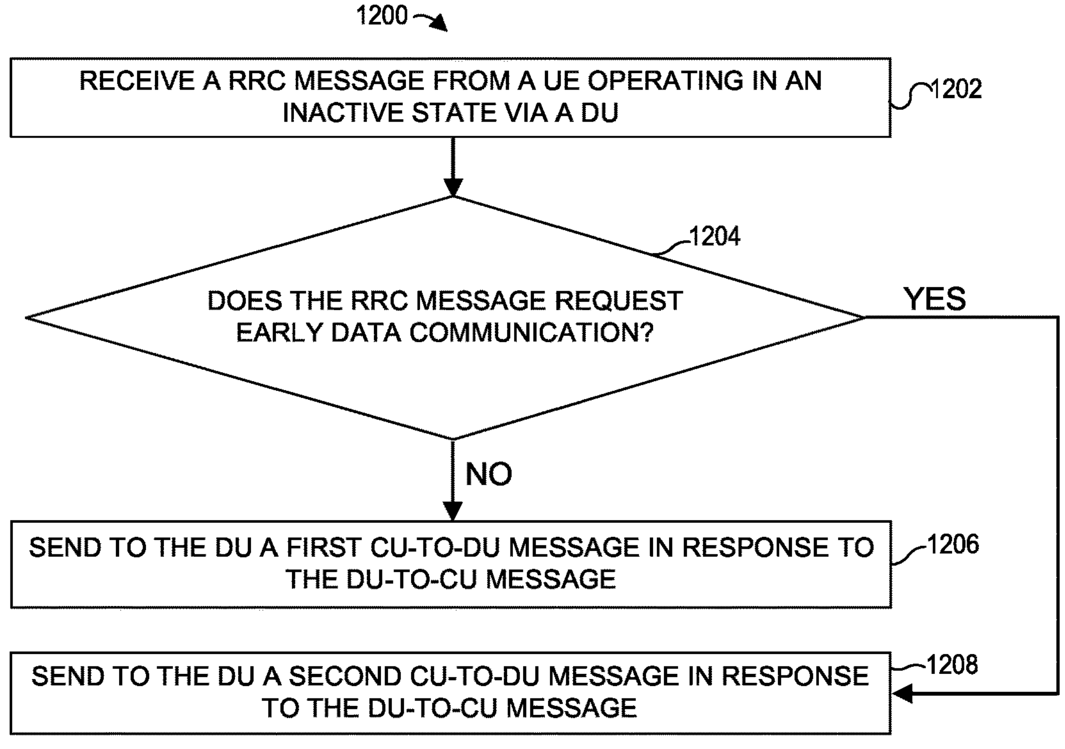
FIG. 12 is a flow diagram of an example method similar to the method of FIG. 11, but where the CU receives an RRC message instead of a DU-to-CU message.

Turning next to FIG. 12, a CU (e.g., the CU 172) can implement an example method 1200 to communicate with a DU for configuring early data communication with a UE (e.g., the UE 102) while the UE operates in an inactive state. Method 1200 is similar to method 1100, except the CU checks whether an RRC message received from the UE indicates that the UE requests early data communication.

Initially, the CU at block 1202 receives, from the DU, an RRC message from the UE operating in an inactive state via the DU (e.g., in events 314, 490, 514). In some implementations, the RRC message is included in the DU-to-CU message described above in FIG. 11. In some implementations, the RRC message can be a CCCH message, an RRC resume request message, or an RRC early data request message. The RRC message can include a UE ID of the UE 102, such as an I-RNTI, resume ID, or a NAS ID.

At block 1204, the CU determines whether the RRC message includes information indicating that the UE requests early data communication. If the CU determines that the RRC message indicates that the UE requests early data communication, the CU at block 1206 sends, to the DU, a first CU-to-DU message in response to the RRC message, similar to block 1106. Consequently, the DU may perform early data communication with the UE. If the CU determines that the RRC message does not indicate that the UE requests early data communication, the CU at block 1208 sends, to the DU, a second CU-to-DU message in response to the RRC message, similar to block 1108. Consequently, the DU may not perform early data communication with the UE.

Figure 13:
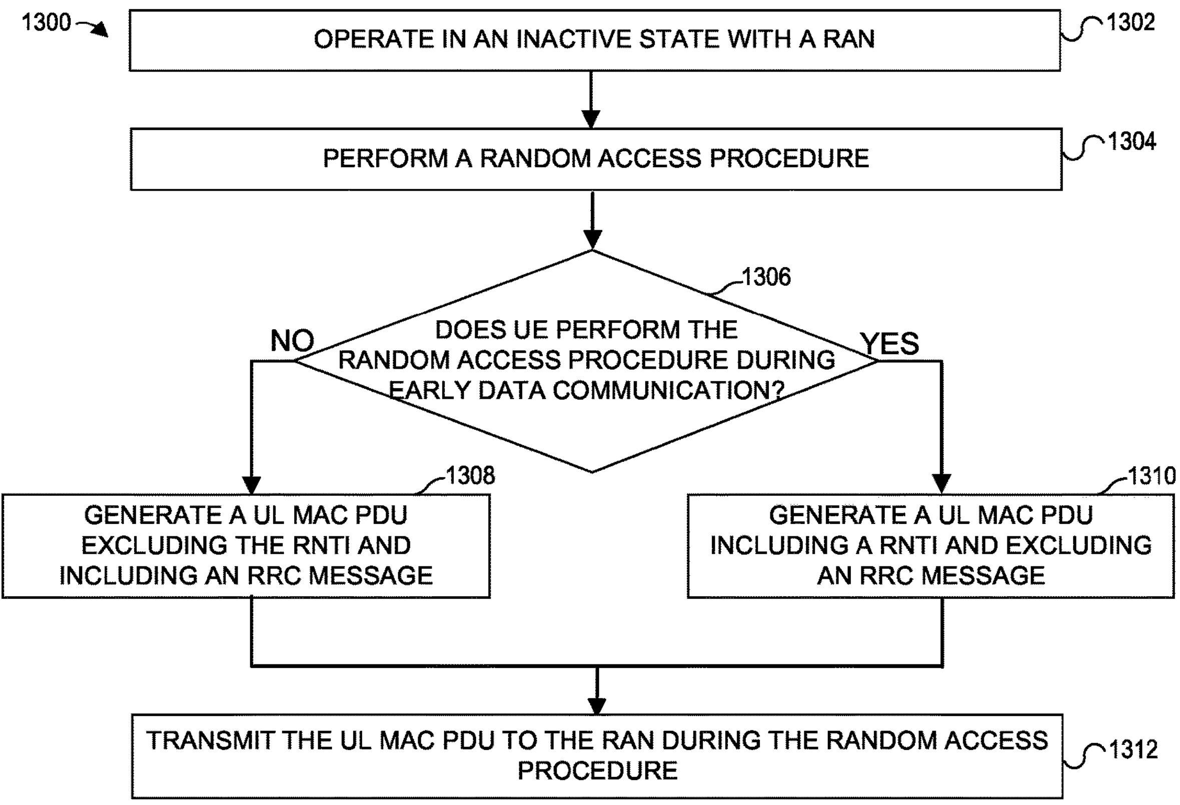
FIG. 13 is a flow diagram of an example method in which a UE of FIG. 1A generates different UL MAC PDUs during a random access procedure depending on whether the UE is performing the random access procedure to initiate an early data communication procedure with a RAN or whether the UE is already performing early data communication with the RAN.

Turning next to FIG. 13, a UE (e.g., the UE 102) operating in an inactive state can implement an example method 1300 to perform a random access procedure to either initiate an early data communication procedure with a RAN (e.g., the RAN 105) or while already performing early data communication with the RAN.

Initially, the UE at block 1302 operates in an inactive state with the RAN (e.g., in events 302, 402). When the UE 102, while remaining in the inactive state, has at least one UL data packet to transmit to the RAN or at least one DL data packet to receive from the RAN, the UE at block 1304 can perform a random access procedure to transmit a UL MAC PDU to the RAN. In some implementations, the random access procedure can be a 4-step random access procedure (e.g., as in FIG. 3A). In other implementations, the random access procedure can be a 2-step random access procedure (e.g., as in FIGS. 3B, 3C). In other implementations, the UE can initially perform a 2-step random access procedure, but due to some circumstances, revert back to performing a 4-step random access procedure (e.g., as in FIG. 3D).

The contents of the UL MAC PDU that is generated by the UE depends on whether the UE performs the random access procedure to initiate an early data communication procedure with the RAN, or whether the UE performs the random access procedure while the UE is already performing early data communication with the RAN. If the UE at block 1306 does not perform the random access procedure during early data communication (i.e., the UE performs the random access procedure to initiate an early data communication procedure with the RAN), the UE generates a UL MAC PDU that excludes a temporary identifier (e.g., first RNTI) and includes an RRC message in the UL MAC PDU (e.g., in events 308, 312, 305, 490). If the UE at block 1306 performs the random access procedure during early data communication, the UE generates a UL MAC PDU that includes a temporary identifier (e.g., first RNTI) and excludes an RRC message in the UL MAC PDU (e.g., in events 338, 337, 492, 588).

After generating the UL MAC PDU, the UE at block 1312 transmits the UL MAC PDU to the RAN as part of the random access procedure (e.g., in events 308, 312, 305, 490, 338, 337, 492, 588).

Figure 14:
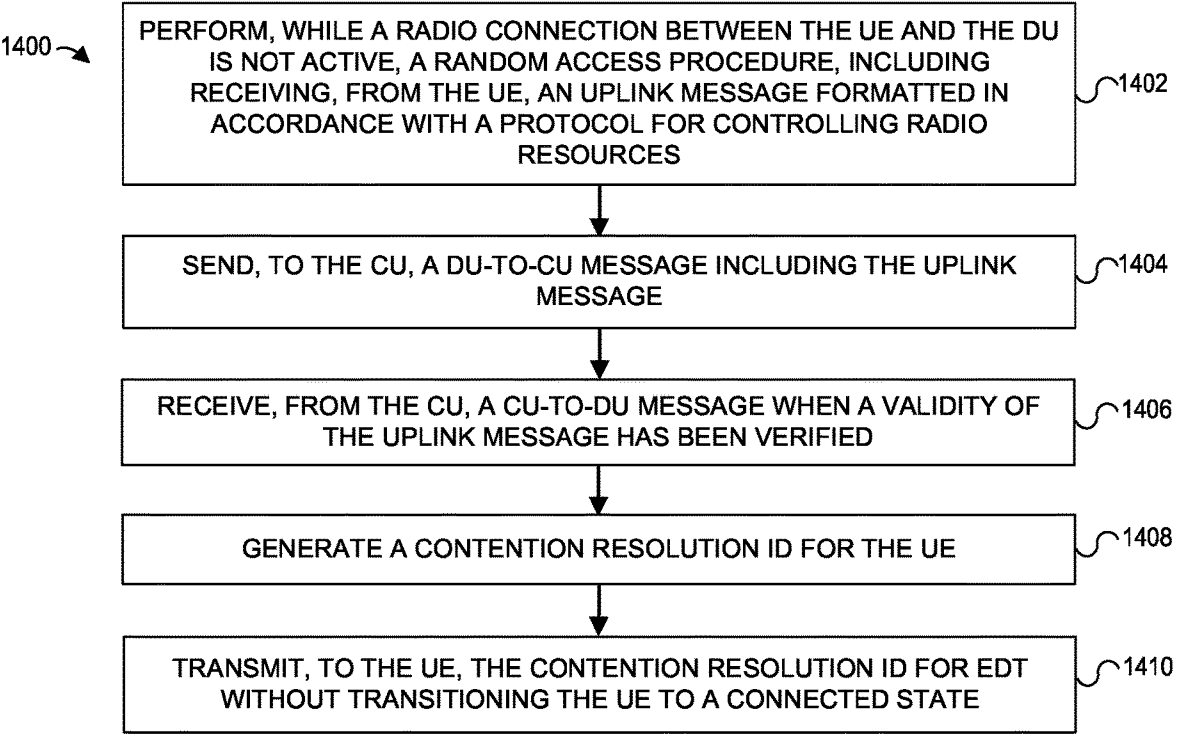
FIG. 14 is a flow diagram of an example method for managing random access for early data communication with a UE, which can be performed by a DU of a distributed base station of FIG. 1A or FIG. 1B.

FIG. 14 is a flow diagram of an example method 1400 for managing random access for early data communication with a UE (e.g., the UE 102), which can be performed by a DU (e.g., the DU 174) of a distributed base station.

At block 1402, the DU performs, while a radio connection between the UE and the DU is not active, a random access procedure, including receiving, from the UE, an uplink message formatted in accordance with a protocol for controlling radio resources (e.g., in events 308, 312, 305, 390, 391, 490).

At block 1404, the DU sends, to the CU, a DU-to-CU message including the uplink message (e.g., in events 314, 390, 391, 490).

At block 1406, the DU receives, from the CU, a CU-to-DU message when a validity of the uplink message has been verified (e.g., in events 318, 418).

At block 1408, the DU generates a contention resolution ID for the UE (e.g., in events 322, 323, 321, 422).

At block 1410, the DU transmits, to the UE, the contention resolution ID for EDT without transitioning the UE to a connected state (e.g., in events 326, 307, 426).

Figure 15:
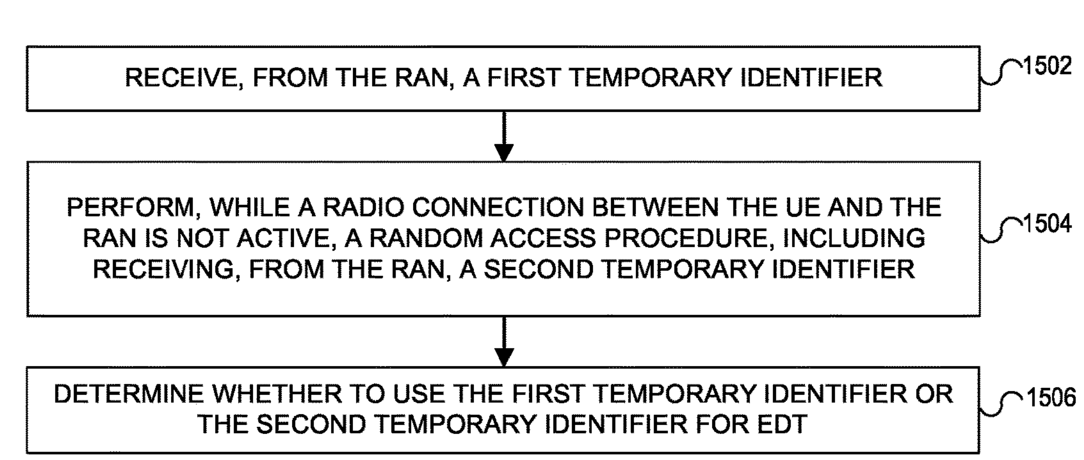
FIG. 15 is a flow diagram of an example method for managing random access for early data communication with a RAN, which can be performed by a UE of FIG. 1A.

FIG. 15 is a flow diagram of an example method 1500 for managing random access for early data communication with a RAN (e.g., RAN 105), which can be performed by a UE (e.g., the UE 102).

At block 1502, the UE receives, from the RAN, a first temporary identifier (e.g., in events 306, 307, 317, 490, 552).

At block 1504, the UE performs, while a radio connection between the UE and the RAN is not active, a random access procedure, including receiving, from the RAN, a second temporary identifier (e.g., in events 336, 341, 492, 588). In some implementations, prior to performing the random access procedure, the UE communicates with the RAN using the first temporary identifier received at block 1502 while the radio connection between the UE and the RAN was active. In other implementations, prior to performing the random access procedure, the UE performs an earlier random access procedure, and receives the first temporary identifier during the earlier access procedure.

At block 1506, the UE determines whether to use the first temporary identifier or the second temporary identifier for EDT. In some implementations, the UE determines to use the first temporary identifier that was assigned by the RAN during the earlier random access procedure. In other implementations, the UE determines to use the second temporary identifier that was assigned by the RAN during the random access procedure described at block 1504.

The following description may be applied to the description above.

In some implementations, "message" is used and can be replaced by "information element (IE)". In some implementations, "IE" is used and can be replaced by "field". In some implementations, "configuration" can be replaced by "configurations" or the configuration parameters. In some implementations, "early data communication" can be replaced by "small data communication" and "early data transmission" can be replaced by "small data transmission".

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IOT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Example 1. A method performed by a distributed unit (DU) of a distributed base station that includes the DU and a central unit (CU), for managing early data transmission (EDT) with a user equipment (UE), the method comprising: performing, by processing hardware and while a radio connection between the UE and the DU is not active, a random access procedure, including receiving, from the UE, an uplink message formatted in accordance with a protocol for controlling radio resources; sending, by the processing hardware to the CU, a DU-to-CU message including the uplink message; receiving, by the processing hardware from the CU, a CU-to-DU message when a validity of the uplink message has been verified; generating a contention resolution identity (ID) for the UE; and transmitting, by the processing hardware to the UE, the contention resolution ID for EDT without transitioning the UE to a connected state.

Example 2. The method of example 1, wherein the DU-to-CU message includes an indication that the UE is requesting to perform EDT.

Example 3. The method of example 1, wherein the uplink message includes an indication that the UE is requesting to perform EDT.

Example 4. The method of any one of examples 1-3, wherein transmitting the contention resolution ID includes transmitting the contention resolution ID in response to and subsequently to receiving the CU-to-DU message.

Example 5. The method of any one of examples 1-3, wherein transmitting the contention resolution ID includes transmitting the contention resolution ID in response to receiving the uplink message and prior to receiving the CU-to-DU message.

Example 6. The method of any one of examples 4-5, wherein transmitting the contention resolution ID includes: generating, by the processing hardware, a downlink Medium Access Control (MAC) protocol data unit (PDU) including the contention resolution identity; and transmitting, by the processing hardware to the UE, the downlink MAC PDU.

Example 7. The method of example 6, wherein transmitting the downlink MAC PDU includes transmitting the downlink MAC PDU including downlink data when the DU determines that the CU-to-DU message includes the downlink data for the UE.

Example 8. The method of example 7, wherein the downlink MAC PDU is a first downlink MAC PDU, the method further comprising: determining, by the processing hardware, that the CU-to-DU message includes downlink data for the UE; and transmitting, by the processing hardware to the UE, a second downlink MAC PDU that includes the downlink data.

Example 9. The method of any one of the preceding examples, wherein: the random access procedure is a first random access procedure; and communicating with the UE includes performing a second random access procedure with the UE while the radio connection between the UE and the distributed base station remains not active and without transitioning the UE to the connected state.

Example 10. The method of example 9, wherein: performing the first random access procedure includes transmitting a first temporary identifier to the UE; and performing the second random access procedure includes transmitting a second temporary identifier to the UE.

Example 11. The method of example 10, wherein communicating with the UE includes communicating with the UE using the first temporary identifier.

Example 12. The method of example 10, wherein communicating with the UE includes communicating with the UE using the second temporary identifier.

Example 13. The method of any of the preceding examples, wherein: the uplink message includes a message authentication code for integrity (MAC-I); and the validity of the uplink message is based on validity of the MAC-I.

Example 14. The method of any of the preceding examples, wherein receiving the uplink message includes receiving the uplink message in a Medium Access Control (MAC).

Example 15. The method of 14, wherein the uplink MAC PDU includes uplink data.

Example 16. A network node of a distributed base station including processing hardware and configured to implement a method according to any one of the preceding examples.

Example 17. A method performed by a user equipment (UE) for managing early data transmission (EDT) with a radio access network (RAN), the method comprising: receiving, by processing hardware and from the RAN, a first temporary identifier; performing, by the processing hardware and while a radio connection between the UE and the RAN is not active, a random access procedure, including receiving, from the RAN, a second temporary identifier; and determining, by the processing hardware, whether to use the first temporary identifier or the second temporary identifier for EDT.

Example 18. The method of example 17, wherein: the random access procedure is a second random access procedure; and receiving the first temporary identifier includes receiving the first temporary identifier during a first random access procedure performed prior to the second random access procedure.

Example 19. The method of example 17, further comprising: prior to performing the random access procedure, communicating, by the processing hardware, with the RAN using the first temporary identifier while the radio connection between the UE and the RAN is active.

Example 20. The method of example 18 or 19, further comprising: communicating, by the processing hardware, with the RAN using the first temporary identifier without transitioning to a connected state.

Example 21. The method of example 18 or 19, further comprising: communicating, by the processing hardware, with the RAN using the second temporary identifier without transitioning to a connected state.

Example 22. A user equipment (UE) including processing hardware and configured to implement a method according to any one of examples 17-21.

What is claimed is:

1. A method performed by a user equipment (UE) for managing early data transmission (EDT) with a radio access network (RAN), the method comprising:

receiving, by the UE and from the RAN, a first temporary cell radio network temporary identifier (C-RNTI); and while the UE is operating in an inactive state:

performing, by the UE, EDT with the RAN using the first temporary C-RNTI;

performing, by the UE, a random access procedure during the EDT, including receiving, from the RAN, a second temporary C-RNTI; and after the receiving of the second temporary C-RNTI, continuing, by the UE, to perform the EDT using the first temporary C-RNTI.

2. The method of claim 1, wherein:

the random access procedure is a second random access procedure; and the receiving of the first temporary C-RNTI includes receiving the first temporary C-RNTI during a first random access procedure performed prior to the second random access procedure.

3. The method of claim 1, further comprising:

prior to the performing of the random access procedure, communicating, by the UE, with the RAN using the first temporary C-RNTI while the UE is operating in a connected state.

4. The method of claim 1, wherein the continuing to perform the EDT using the first temporary C-RNTI includes continuing to perform the EDT using the first temporary C-RNTI without transitioning into a connected state.

5. A method performed by a user equipment (UE) for managing early data transmission (EDT) with a radio access network (RAN), the method comprising:

receiving, by the UE and from the RAN, a first temporary cell radio network temporary identifier (C-RNTI);

receiving, by the UE and from the RAN, a configured grant configuration instructing the UE to transition into an inactive state;

responsively transitioning, by the UE, into the inactive state; and while the UE is operating in an inactive state:

performing, by the UE, EDT with the RAN using the configured grant configuration;

performing, by the UE, a random access procedure during the EDT, including receiving, from the RAN, a second temporary C-RNTI; and after the receiving of the second temporary C-RNTI, continuing, by the UE, to perform the EDT using the first temporary C-RNTI.

6. The method of claim 5, wherein the configuration grant configuration is included in a Radio Resource Control (RRC) release message.

7. The method of claim 5, further comprising:

prior to the performing of the random access procedure, communicating, by the UE, with the RAN using the first temporary C-RNTI while the UE is operating in a connected state.

8. The method of claim 5, wherein the continuing to perform the EDT using the first temporary C-RNTI includes continuing to perform the EDT using the first temporary C-RNTI without transitioning into a connected state.

9. A method performed by a radio access network (RAN) for managing early data transmission (EDT) with a user equipment (UE), the method comprising:

transmitting, by the RAN and to the UE, a first temporary cell radio network temporary identifier (C-RNTI); and while a radio connection between the RAN and the UE is inactive:

performing, by the RAN, EDT with the UE using the first temporary C-RNTI;

performing, by the RAN, a random access procedure during the EDT, including transmitting, from the RAN and to the UE, a second temporary C-RNTI; and after the transmitting of the second temporary C-RNTI, continuing, by the RAN, to perform the EDT using the first temporary C-RNTI.

10. The method of claim 9, wherein:

the random access procedure is a second random access procedure; and the transmitting of the first temporary C-RNTI includes transmitting the first temporary C-RNTI during a first random access procedure performed prior to the second random access procedure.

11. The method of claim 9, further comprising prior to the performing of the random access procedure, communicating, by the RAN, with the UE using the first radio C-RNTI while the radio connection is active.

12. The method of claim 9, wherein the continuing to perform the EDT using the first temporary C-RNTI includes continuing to perform the EDT using the first temporary C-RNTI without the UE transitioning into a connected state.

13. A method performed by a radio access network (RAN) for managing early data transmission (EDT) with a user equipment (UE), the method comprising:

transmitting, by the RAN and to the UE, a first temporary cell radio network temporary identifier (C-RNTI);

transmitting, by the RAN and to the UE, a configured grant configuration instructing the UE to transition into an inactive state; and while a radio connection between the RAN and the UE is inactive:

performing, by the RAN, the EDT with the UE using the configured grant configuration;

performing, by the RAN, a random access procedure during the EDT, including transmitting, from the RAN and to the UE, a second temporary C-RNTI; and after the transmitting of the second temporary C-RNTI, continuing, by the RAN, to perform the EDT using the first temporary C-RNTI.

14. The method of claim 13, wherein the configuration grant configuration is included in a Radio Resource Control (RRC) release message.

15. The method of claim 13, further comprising prior to the performing of the random access procedure, communicating, by the RAN, with the UE using the first temporary C-RNTI while the radio connection is active.

16. The method of claim 13, wherein the continuing to perform the EDT using the first temporary C-RNTI includes continuing to perform the EDT using the first temporary C-RNTI without the UE transitioning into a connected state.

* * * * *